US007370336B2

(12) United States Patent
Husain et al.

(10) Patent No.: US 7,370,336 B2
(45) Date of Patent: May 6, 2008

(54) DISTRIBUTED COMPUTING INFRASTRUCTURE INCLUDING SMALL PEER-TO-PEER APPLICATIONS

(75) Inventors: Syed Mohammad Amir Husain, Austin, TX (US); Todd John Enright, Austin, TX (US); Barry W. Thornton, Austin, TX (US)

(73) Assignee: ClearCube Technology, Inc., Austin, TX (US)

( * ) Notice: Subject to any disclaimer, the term of this patent is extended or adjusted under 35 U.S.C. 154(b) by 752 days.

(21) Appl. No.: 10/662,933

(22) Filed: Sep. 15, 2003

(65) Prior Publication Data
US 2005/0060432 A1    Mar. 17, 2005

Related U.S. Application Data

(60) Provisional application No. 60/411,066, filed on Sep. 16, 2002.

(51) Int. Cl.
*G06F 3/00* (2006.01)
(52) U.S. Cl. ...................................... 719/328
(58) Field of Classification Search ............... 719/328
See application file for complete search history.

(56) References Cited

U.S. PATENT DOCUMENTS

| | | | |
|---|---|---|---|
| 5,987,376 A | | 11/1999 | Olson et al. |
| 6,347,342 B1* | | 2/2002 | Marcos et al. ............... 719/315 |
| 6,353,608 B1 | | 3/2002 | Cullers et al. |
| 6,564,246 B1 | | 5/2003 | Varma et al. |
| 6,629,129 B1* | | 9/2003 | Bookspan et al. .......... 709/204 |
| 6,643,652 B2 | | 11/2003 | Helgeson et al. |
| 6,658,526 B2 | | 12/2003 | Nguyen et al. |
| 6,779,184 B1* | | 8/2004 | Puri et al. ................... 719/315 |
| 6,948,000 B2* | | 9/2005 | Desai et al. ................. 709/245 |
| 7,111,076 B2 | | 9/2006 | Abjanic et al. |
| 7,222,156 B2* | | 5/2007 | Gupta et al. ................ 709/206 |
| 2003/0120751 A1* | | 6/2003 | Husain et al. .............. 709/219 |

FOREIGN PATENT DOCUMENTS

| | | |
|---|---|---|
| EP | 1 043 671 A2 | 10/2000 |
| WO | WO 00/39713 | 7/2000 |
| WO | WO 01/06365 A2 | 1/2001 |
| WO | WO 02/32171 A1 | 4/2002 |

OTHER PUBLICATIONS

International search report for application No. PCT/US2003/028918 mailed Dec. 16, 2004.

* cited by examiner

*Primary Examiner*—W. Thomson
*Assistant Examiner*—LeChi Truong
(74) *Attorney, Agent, or Firm*—Meyertons Hood Kivlin Kowert & Goetzel, P.C.; Jeffrey C. Hood

(57) ABSTRACT

Systems and methods are disclosed for a distributed computing infrastructure on a computer network comprising a plurality of computers. The distributed computing infrastructure (DCI) provides a software platform for creating, running, and managing distributed applications. DCI may include XML-capable software applications on a peer-to-peer network. DCI may include small, network-unaware applications called peerlets. DCI may include a system and method for creating complex distributed applications using pre-complied binaries. DCI may include a capability for multiple, independent collaborative sessions for distributed collaborative applications (e.g., chat, instant messaging, shared whiteboard, etc.). DCI may include systems and methods for reducing interactions between users and applications to archivable form and then playing back the interactions. DCI may include a system and method for automatic software retrieval on a peer-to-peer network.

36 Claims, 26 Drawing Sheets

DISTRIBUTED COMPUTING INFRASTRUCTURE INCLUDING SMALL PEER-TO-PEER APPLICATIONS

PRIORITY CLAIM

This application claims benefit of priority of provisional application Ser. No. 60/411,066 titled "Distributed Computing Infrastructure" filed on Sep. 16, 2002, whose inventors are Amir Husain, Todd Enright, and Barry Thornton.

BACKGROUND OF THE INVENTION

1. Field of the Invention

The present invention relates generally to computer systems and specifically to distributed computing and storage mechanisms on networked computer systems.

2. Description of the Related Art

Many commercial businesses and enterprises make extensive use of personal computers (PCs) in their daily operations. Typically, each user of a PC in the enterprise has a networked PC at his/her desk or work area. As the number of networked computer systems utilized in an enterprise increases, the management of resources in the network may become increasingly complex and expensive. Some of the manageability issues involved in maintaining a large number of networked computer systems may include ease of installation and deployment, the topology and physical logistics of the network, asset management, scalability (the cost and effort involved in increasing the number of units), troubleshooting network or unit problems, support costs, software tracking and management, as well as the simple issue of physical space, be it floor space or room on the desktop, as well as security issues regarding physical assets, information protection, software control, and computer virus issues.

A typical computer system has I/O access to one or more volumes on a storage device such as a hard drive. A volume generally includes an amount of free (unused) storage space which varies over time. When the number of computers and respective volumes in the networked system becomes very large, the total amount of unused storage may become significant.

Multiple PCs that are centralized and closely coupled are often suitable for performing distributed computing tasks. Traditionally, tasks that are performed across multiple computers tend to include processor-intensive algorithms and tasks that can be easily broken into manageable chunks. These programs must typically be re-written from the ground up to take advantage of multiple PCs and shared resources. Existing software, including applications that traditionally have not been performed in a distributed manner, are often not configured to take advantage of distributed computing possibilities.

Therefore, an improved system is desired for configuring networked computer systems to use network storage resources in an efficient manner.

SUMMARY OF THE INVENTION

Various embodiments of a system and method for managing data storage for a plurality of computer systems are presented. In one embodiment, the computer systems may be configured to access virtual network attached storage (referred to herein as a shared storage volume). The computer systems may include a first computer, having a first processor and a first storage medium coupled to the first processor, and a peripheral device, e.g., a keyboard, monitor, mouse, or other type of peripheral device. The computer systems may further include a second computer having a second processor and a second storage medium coupled to the second processor. in one embodiment, the first computer and the second computer may each be configured on a respective computer blade, also referred to as a "computer on a card." A communication link, e.g., a bus, may couple the first computer to the second computer. A peripheral switch may be coupled to the first computer, the second computer, and the peripheral device. The peripheral switch may be configured to route signals between the peripheral device and the first computer.

In one embodiment, each computer may have some file server functionality. The file server functionality may include some I/O functionality, and may also include functionality for negotiating file write and read protocols. Communicating with the storage medium on the computer may be analogous to communicating with a standard file server attached memory. The computer may negotiate information writes similar to a file server, and order and prioritize transactions. In one embodiment, the computer may also implement striping analogous to that used by RAID (Redundant Array of Inexpensive Disks).

The hardware platform described above, due to its dense configuration and increased manageability, may provide a highly effective clustering solution. In one embodiment, a Distributed Computing Infrastructure (DCI) adds to these underlying capabilities by providing a software platform for creating, running, and managing distributed applications. In one embodiment, the DCI software solution includes a framework that provides a variety of management and deployment functions for creating and running large-scale distributed applications. In one embodiment, DCI may be implemented using a Java-based framework. The infrastructure is not dependent on the presence of a server and therefore eliminates a single-point bottleneck that often slows performance of distributed applications. The DCI solution is primarily designed to make it easy for domain specialists (biologists, mathematicians, etc.) to re-leverage existing code modules, scripts, and applications and adapt them to make use of the immense power of cluster solutions.

In one embodiment, DCI may include XML-capable software applications on a peer-to-peer network. A source application on a first computer system may generate a message intended for a second computer system. Using DCI, the message may be translated from an original, internal, or other native format to a portable format (e.g., XML) on the first computer system, thereby generating a portable (e.g., XML) message. The portable message may include metadata which comprise identifying characteristics of the source application. The portable message may be sent from the first computer system to a second computer system using peer-to-peer message passing between the first computer system, the second computer system, and optionally one or more intermediary computer systems. After being received at the second computer system, the portable message may be routed using DCI to an appropriate target application based on the metadata.

In one embodiment, DCI may include small, network-unaware applications called "peerlets." Peerlets may be suitable for applications including chat, shared whiteboard, and other collaborative applications. A peerlet on a first computer system may generate a message (including collaborative data such as chat text or whiteboard graphics) and send the message to the distributed computing infrastructure using an API. The DCI may translate the message from an original or native format to a portable format (e.g., XML), thereby generating a portable (e.g., XML) message, wherein the portable message comprises metadata which comprise identifying characteristics of the source peerlet. The portable message may then be sent from the first computer system to a second computer system using peer-to-peer message passing between the first computer system, the second computer system, and optionally one or more intermediary computer systems;. After the portable message is received at the second computer system, DCI may route the portable message to a target peerlet on the second computer system based on the metadata. Like the source peerlet, the target peerlet is configured to communicate using the API to the distributed computing infrastructure API.

In one embodiment, DCI may include a system and method for creating complex distributed applications using pre-complied binaries or other functions on distributed computer systems. Instructions for performing a complex task may be sent a first computer system to one or more remote computer systems. The instructions for performing the task may comprise instructions for performing one or more subtasks with each of a plurality of applications. The instructions for performing the task may comprise a plurality of messages in a portable format (e.g., XML). At the one or more remote computer systems, the instructions for performing the task may be translated using DCI from the portable format to a format which is executable, thereby generating executable instructions for performing the plurality of subtasks. Finally, the executable instructions may be executed at the remote computer systems to perform the subtasks comprising the task.

In one embodiment, DCI may include a capability for multiple, independent collaborative sessions for distributed collaborative applications (e.g., chat, instant messaging, shared whiteboard, etc.). Using DCI, collaborative data may be sent from a first instance of the collaborative application on a first computer system to a second instance of the collaborative application on a second computer system. In return, collaborative data may be sent from the second instance of the collaborative application to the first instance of the collaborative application. Likewise, collaborative data may be sent from a third instance of the collaborative application on the first computer system to a fourth instance of the collaborative application on the second computer system, and from the fourth instance to the third instance. Each instance of the collaborative application may be associated with a globally unique ID (GUID) which distinguishes the respective instance from other instances in the networked computing environment. When sending collaborative data to a target computer system, the application type of the relevant collaborative application may be determined. If there is already an instance of the application type on the target computer system, the collaborative data may be sent to the existing instance. If not, a new instance may be instantiated and may receive the collaborative data.

In one embodiment, DCI may include a system and method for reducing interactions between users and applications to an archivable form. User input may be entered to a source application on a first computer system to request performance of a task. In response, the task may be performed. A message may also be generated in response to the user input, wherein the message comprises one or more instructions which are computer-executable to perform the task. The message may include metadata which comprise identifying characteristics of the source application. The message may be translated from an original or native format (e.g., a internal format which is suitable for communication with an API, or a format which is suitable for execution) to a portable format (e.g., XML) on the first computer system, thereby generating a portable message. The portable message may be stored in a message log or message queue for retrieval and/or playback at a later time. The instructions in the message may be retrieved and re-executed on the same computer system or different computer systems.

In one embodiment, DCI may include an Autonomous Intelligent Management System (AIMS). AIMS may provide for the retrieval and playback of archived portable messages (e.g., XML messages) to perform a task on one or more target computer systems in a network. The target computer systems need not be the original computer system on which the instructions for the task were recorded.

In one embodiment, DCI may include a system and method for automatic software retrieval on a peer-to-peer network. Software may be sent from a first computer system to one or more remote computer systems along with instructions for automatically installing the software at the remote computer systems. The instructions for deploying the software may comprise one or more messages in a portable format (e.g., XML). Using DCI, the instructions for installing the software may be translayed from the portable format to an executable format at each of the one or more remote computer systems, thereby generating executable instructions. The executable instructions may then be executed to install the software at each of the one or more remote computer systems.

BRIEF DESCRIPTION OF THE DRAWINGS

A better understanding of the present invention may be obtained when the following detailed description of the preferred embodiment is considered in conjunction with the following drawings, in which.

Figure 1:
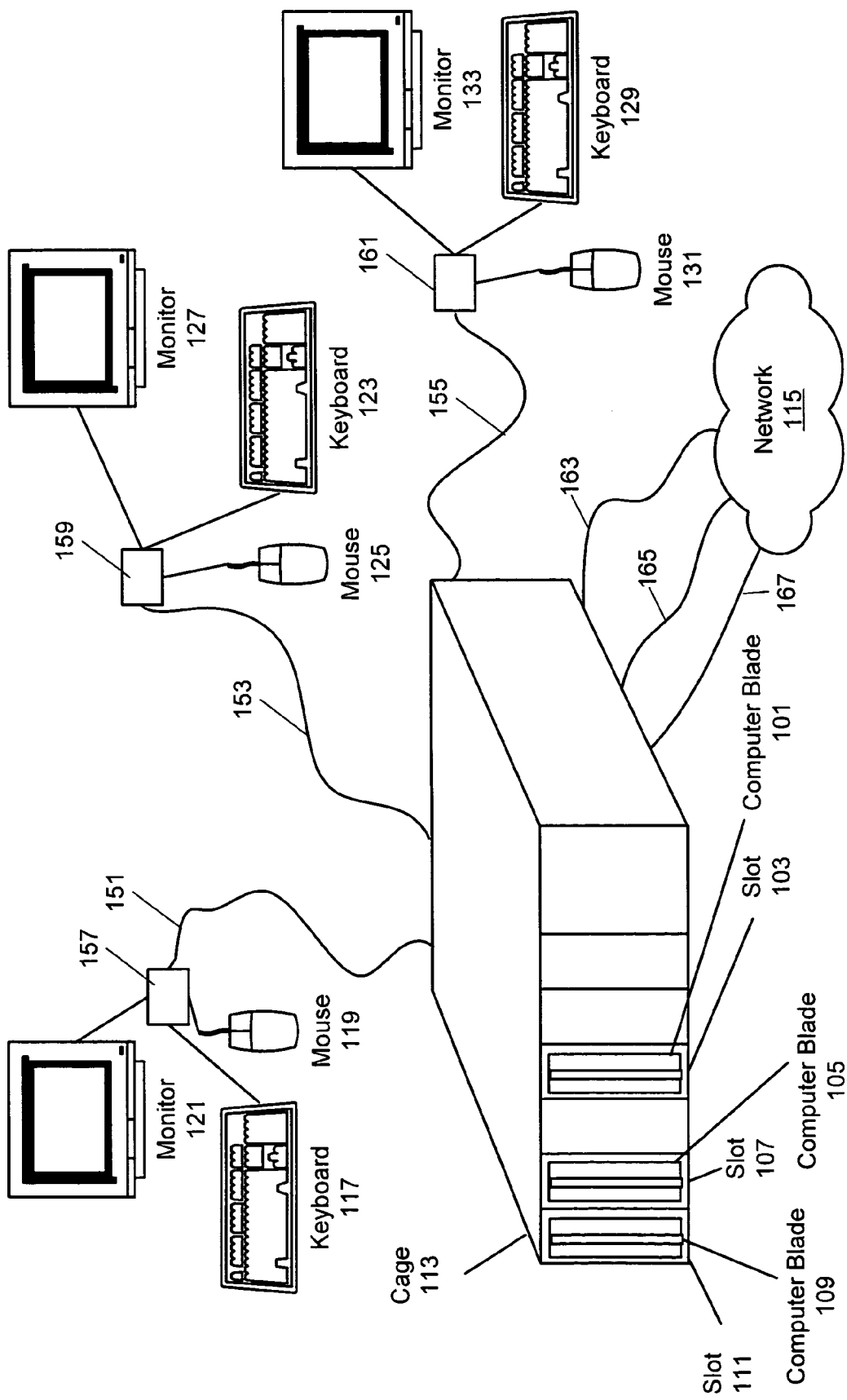
FIG. 1 illustrates computer systems including peripheral devices coupled to computer blades in a cage, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

Incorporation by Reference

U.S. Provisional Patent No. 60/144,809 titled "A Technique To Extend The Operating Distance Of A Universal Serial Bus" is hereby incorporated by reference in its entirety as though fully and completely set forth herein.

U.S. Pat. No. 6,119,146 titled "Computer Network Having Multiple Remotely Located Human Interfaces Sharing A Common Computing System", which was filed May 4, 1998, whose inventors are Barry Thornton, Andrew Heller, Daniel Barrett, and Charles Ely, is hereby incorporated by reference in its entirety as though fully and completely set forth herein.

U.S. Pat. No. 6,038,616 titled "Computer System With Remotely Located Interface Where Signals Are Encoded At The Computer System, Transferred Through A 4-Wire Cable, And Decoded At The Interface", which was filed May 4, 1998, whose inventors are Barry Thornton, Andrew Heller, Daniel Barrett, and Charles Ely, is hereby incorporated by reference in its entirety as though fully and completely set forth herein.

U.S. Pat. No. 6,012,101 titled "Computer Network Having Commonly Located Computing Systems", which was filed May 4, 1998, whose inventors are Andrew Heller, Barry Thornton, Daniel Barrett, and Charles Ely, is hereby incorporated by reference in its entirety as though fully and completely set forth herein.

U.S. patent application Ser. No. 09/179,809 titled "A Technique To Transfer Multiple Information Streams Over A Wire Or Wireless Medium" is hereby incorporated by reference in its entirety as though fully and completely set forth herein.

U.S. patent application Ser. No. 09/619,989 titled "System And Method For Providing A Remote Universal Serial Bus", which was filed Jul. 20, 2000, whose inventors are Dan Barrett, Mike Barron, and Andrew Heller, is hereby incorporated by reference in its entirety as though fully and completely set forth herein.

U.S. patent application Ser. No. 09/680,760 titled "System And Method For Combining Computer Video And Remote Universal Serial Bus In An Extended Cable", which was filed Oct. 6, 2000, whose inventor is Barry Thornton, is hereby incorporated by reference in its entirety as though fully and completely set forth herein.

U.S. patent application Ser. No. 09/728,667 titled "Computer On A Card With A Remote Human Interface", which was filed Dec. 12, 2000, whose inventors are Andrew Heller and Barry Thornton, is hereby incorporated by reference in its entirety as though fully and completely set forth herein.

U.S. Pat. No. 5,530,960 titled "Disk drive controller accepting first commands for accessing composite drives and second commands for individual diagnostic drive control wherein commands are transparent to each other", which was filed on Jun. 25, 1996, whose inventors are Terry J. Parks, Kenneth L Jeffries, and Craig S. Jones, is hereby incorporated by reference in its entirety as though fully and completely set forth herein.

U.S. Pat. No. 5,483,641 titled "System for scheduling readahead operations if new request is within a proximity of N last read requests wherein N is dependent on independent activities", which was filed on Jan. 9, 1996, whose inventors are Terry J. Parks, Kenneth L Jeffries, and Craig S. Jones, is hereby incorporated by reference in its entirety as though fully and completely set forth herein.

U.S. patent application Ser. No. 09/892,324 titled "Computer System Having a Remotely Located Human Interface Using Computer I/O Bus Extension", which was filed Jun. 25, 2001, whose inventors are Ray DuPont, Mike Tullis, and Barry Thornton, is hereby incorporated by reference in its entirety as though fully and completely set forth herein.

U.S. patent application Ser. No. 09/892,331 titled "System Comprising Multiple Co-Located Computer Systems Each Having a Remotely Located Human Interface Using Computer I/O Bus Extension", which was filed Jun. 25, 2001, whose inventors are Ray DuPont, Mike Tullis, and Barry Thornton, is hereby incorporated by reference in its entirety as though fully and completely set forth herein.

U.S. Provisional Application Ser. No. 60/332,143 titled "A Fail Forward Networked Storage System" filed on Nov. 21, 2001, whose inventor is Barry Thornton, is hereby incorporated by reference in its entirety as though fully and completely set forth herein.

U.S. Provisional Application Ser. No. 60/411,066 titled "Distributed Computing Infrastructure" filed on Sep. 16, 2002, whose inventors are Amir Husain, Todd Enright, and Barry Thornton, is hereby incorporated by reference in its entirety as though fully and completely set forth herein.

U.S. patent application Ser. No. 10/301,518 titled "Distributed Resource Manager" filed on Nov. 21, 2002, whose inventors are Syed Mohammad Amir Husain, Todd John Enright, and Barry W. Thornton, is hereby incorporated by reference in its entirety as though fully and completely set forth herein.

U.S. patent application Ser. No. 10/301,536 titled "Data Fail-Over For A Multi-Computer System" filed on Nov. 21, 2002, whose inventors are Syed Mohammad Amir Husain, Todd John Enright, and Barry W. Thornton, is hereby incorporated by reference in its entirety as though fully and completely set forth herein.

Figure 2:
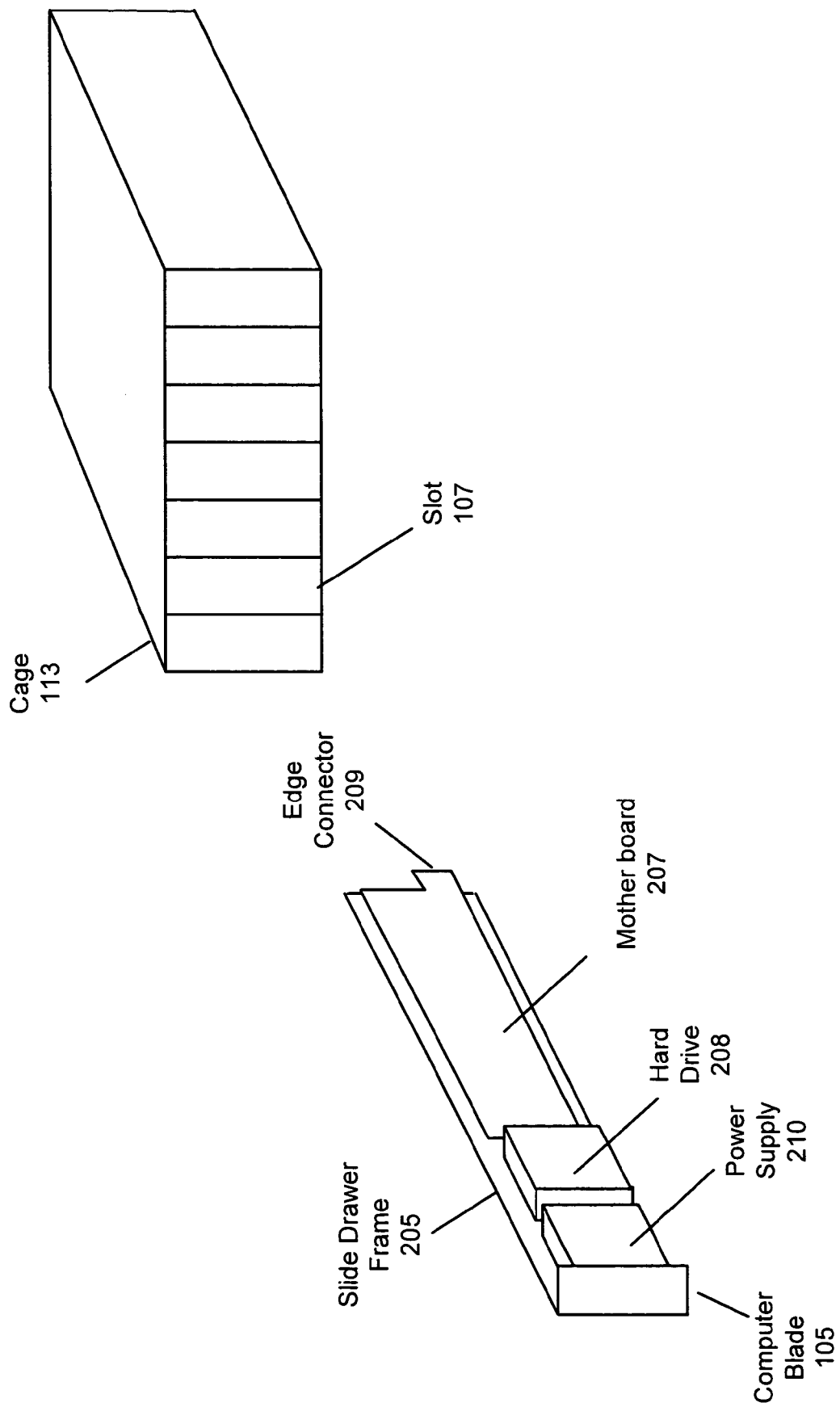
FIG. 2 illustrates a computer blade pulled out of the cage, according to one embodiment.
Figure 3:
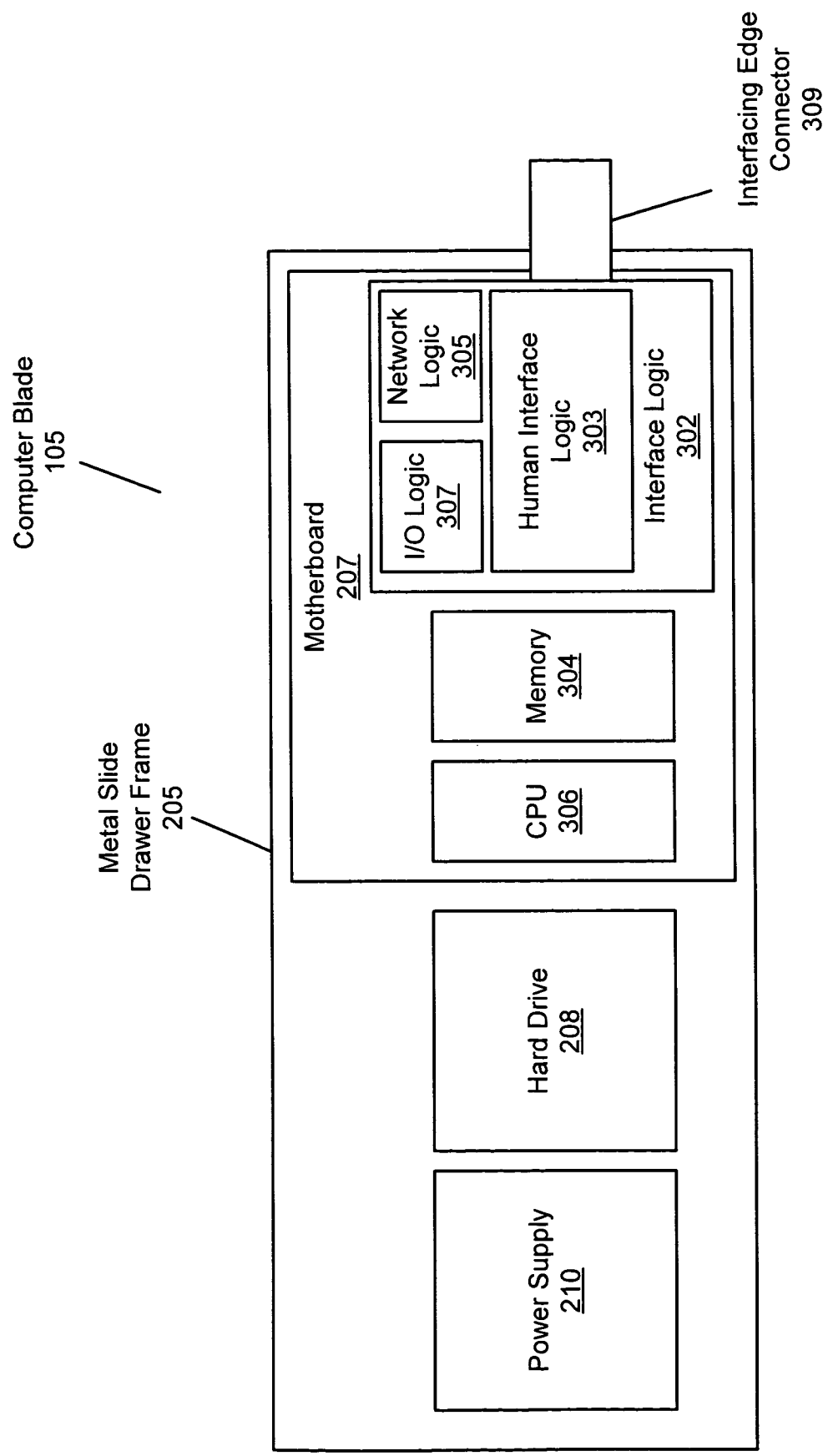
FIG. 3 illustrates a computer blade having a power supply, hard drive, and motherboard, according to one embodiment.

FIG. 1-3—Elements of Computer Systems Used in Various Embodiments

FIGS. 1-3 illustrate computer system components that may be used in various embodiments of the invention. As FIG. 1 indicates, in one embodiment, the system may include a plurality of computer systems, where each computer system may include at least one peripheral device, e.g., comprised in a human interface, and a computer blade. In one embodiment, a computer blade (or "blade") may comprise a "computer on a card." In other words, the computing system may be comprised on a circuit card which may include standard computing system components such as a CPU, memory, power supply, and network interface, as well as an extender, e.g., a PCI extender, for communicating with the remote human interface. Other types of computer systems and components, including standard desktop PCs, may also be used to implement the system and method for virtual network attached storage. The computer system may include various components necessary for computer operations, such as, but not limited to, a processor and a storage medium. For further information regarding the use of multiple computer blades in a system, please see U.S. patent application Ser. No. 09/728,667 titled "Computer On A Card With A Remote Human Interface", which was filed Dec. 12, 2000, whose inventors are Andrew Heller and Barry Thornton, which was incorporated by reference above.

As will be described in detail below, various embodiments of the present invention may be implemented using the systems of FIGS. 1-3, where, for example, information from a first storage medium on a first computer blade may be copied to a second storage medium on a second computer blade. For example, the information may be copied before, during, or after a fail-over condition is detected on the first computer blade. Note that as used herein, the term "fail-over condition" may refer to an impending failure of a component, to the component failure itself, or to a condition of a computer that requires attention. A computer that indicates a fail-over condition may be referred to as a "failed" computer, even if an actual component failure has not occurred. Thus, detection of a fail-over condition may occur before an actual failure, or may occur during or after the failure (detection of the fail-over condition). For example, a fail-over condition may indicate failure of a processor, impending failure of a processor, or even that the performance, e.g., the processing capability, of the computer needs to be upgraded or modified. Once the fail-over condition has been detected, then various actions may be taken to restore, replace, or improve, functionality of the computer. A fail-over condition may include, but is not limited to, a hard drive crash or a short circuit in a processor, or indications that such a crash or short circuit is imminent or likely. In one embodiment, software executing on one or more of the computer blades, optionally including the first computer blade, may continually monitor the first computer blade for a fail-over condition. Other ways of detecting a fail-over condition on the first computer blade may also be within the scope of the invention. Once a fail-over condition is detected, a peripheral switch may switch a first computer peripheral device over to a second computer blade. In other words, the peripheral switch may switch the human interface from the first (failing or failed) computer blade to the second (replacement) computer blade.

In various embodiments, the information from the first storage medium may be copied prior to the fail-over condition. For example, the information may be copied directly to the second computer blade, or alternatively, the information may be copied onto a third storage medium on a third computer blade, where after the fail-over condition is detected, the information from the first storage medium (now stored on the third storage medium) may be copied onto the second storage medium of the second computer blade. A peripheral switch may then switch the first computer peripheral device over to the second computer blade, and the user of the first computer system may continue accessing the information from the first storage medium without losing user time. Of course, the peripheral switch may be further operable to switch a plurality of peripheral devices in the human interface, i.e., the number peripheral devices switched is not limited to one. In addition, a peripheral switch may not be needed in an embodiment where a backup component, such as, but not limited to a backup processor or a backup storage medium, is coupled to the first computer prior to or after a fail-over condition is detected in a corresponding component on the first computer. For example, if a processor on the first computer has a fail-over condition, a backup processor may be coupled to the first computer to take the place of the processor on the first computer with a fail-over condition.

FIG. 1—Computer Blades and Respective Peripheral Devices

Referring to FIG. 1, an embodiment of computer systems including peripheral devices coupled to computer blades in a cage is shown. While one embodiment may include computer blades, it is noted that other computer types and forms may also be within the scope of the invention. In other words, the embodiment shown in FIG. 1 is intended to be exemplary only, and is not intended to limit the types or number of computer systems used.

As FIG. 1 shows, connecting cables 151, 153, and 155 may connect computer blades 101, 105, and 109 to respective peripheral device groups through respective device ports or hubs, referred to herein as C-Ports, 157, 159, and 161. In one embodiment, each device port may comprise an extender device that may enable transmission of user interface signals (i.e., peripheral device signals) over distances generally not allowed by standard protocols such as USB. For further information regarding extended communications between a computer and a remote human interface, please see U.S. patent application Ser. No. 09/892,324 titled "Computer System Having a Remotely Located Human Interface Using Computer I/O Bus Extension", which was filed Jun. 25, 2001, and U.S. patent application Ser. No. 09/892,331 titled "System Comprising Multiple Co-Located Computer Systems Each Having a Remotely Located Human Interface Using Computer I/O Bus Extension", both of which were incorporated by reference above.

In one embodiment, the peripheral device groups, such as the peripheral device group coupled to connecting cable 151, may include a keyboard 117, a pointing device, e.g., a mouse 119, a display device, e.g., a computer monitor 121, and/or other peripheral devices for human interface. The computer blade, such as computer blade 105, may communicate with the peripheral devices coupled to the computer blade 105 by sending and receiving encoded human interface signals transmitted over the connecting cable 151. In one embodiment, a cage 113, e.g., a metal cabinet or chassis, may have a plurality of slots, such as slots 103, 107, and 111. The computer blades 101, 105, and 109 may be inserted into the slots 103, 107, and 111, respectively. The cage 113 may also include cage connectors (not shown) to couple the computer blades 101, 105, and 109 to their respective connecting cables 155, 153, and 151.

The computer blades 101, 105, and 109 may be installed in the cage 113 at a central location, while the peripheral devices for each computer blade 101, 105, and 109 may be located remotely from the cage 113, such as at respective work areas of the users of the computer blades 101, 105, and 109. The separation of the peripheral device groups from the computer blades 101, 105, and 109 may allow easier software installation across a network, such as but not limited to downloading CD-ROMs, and provide a central location of multiple computers which may simplify both hardware and software maintenance.

Each computer blade 101, 105, and 109 may also be coupled to a network 115 through an on-board network logic (not shown). The network 115 may be a Local Area Network (LAN) or a Wide Area Network (WAN), such as the Internet, although other networks are also contemplated. As mentioned above, in one embodiment, the computer blades 101, 105, and 109 may be inserted into respective slots 103, 107, and 111 of the cage 113, and coupled to respective peripheral device groups through the cage connectors (not shown) and connecting cables 151, 153, and 155. In one embodiment, each computer blade 101, 105, and 109 may also be coupled to the network 115 through the cage connectors (not shown) and a network cable, such as Ethernet cables 163, 165, and 167.

FIG. 2—Computer Blade

Referring to FIG. 2, an embodiment of a computer blade 105 is shown. In one embodiment, the computer blade 105 may include components such as but not limited to a slide drawer frame 205, motherboard 207, a power supply 210, and a hard drive 208, as shown. In one embodiment, the motherboard 207, the power supply 210, and the hard drive 208 may be coupled to the slide drawer frame 205. In one embodiment, the slide drawer frame 205 may be three rack units high (or approximately 5.25 inches) to occupy a much smaller space than standard PC units, although other slide drawer frame 205 dimensions may also be within the scope of the invention.

The motherboard 207 may be a printed circuit board with components such as but not limited to a central processing unit (CPU), memory, and LAN interface. Other types of motherboards and other types of motherboard components are also contemplated. The hard drive 208 may be a non-volatile memory such as but not limited to a hard drive, optical drive, and/or flash memory. The computer blade 105 may communicate with external systems such as but not limited to peripheral devices and networks, through an edge connector 209. In one embodiment, the edge connector 209 may transmit signals such as but not limited to network signals, input/output (I/O) signals, video signals, audio signals, and universal serial bus (USB) signals. For example, the edge connector may communicate network signals to a network and encoded human interface signals to a group of peripheral devices.

In one embodiment, the computer blade 105 may further include power supply 210 mounted on the slide drawer frame 205 with an internal power source or coupled to an external power source (not shown) to provide power to the computer blade 105. The power supply 210 may convert local main power to an appropriate voltage for the computer blade 105. Because computer blade 105 has an individual power supply 210, if the power supply 210 fails, computer blade 105 may be the only computer blade that fails. In one embodiment, a single power supply located in the cage 113 (shown in FIG. 1) may supply power to several computer blades such as computer blades 101, 105, and 109 (shown in FIG. 1). However, a single power supply for the cage 113 (shown in FIG. 1) may be a single point of failure for the cage 113. If the single power supply fails, multiple computer blades may also fail, requiring multiple replacement blades. In a system with a single power supply for a cage 113, the computer blades 101, 105, and 109 may all require stand-by replacement blades connected to another power source. If the power supply for the cage 113 fails, information from the computer blades 101, 105, and 109 may be copied onto the replacement computer blades from other computer blades in the system to which information from the computer blades 101, 105, and 109 had been previously copied.

As FIG. 2 also illustrates, in one embodiment, cage 113 may have a plurality of slots, such as slot 107, to house the computer blade 105. The computer blade 105 may be inserted into one of the slots of the cage 113, such as slot 107. The cage 113 may include a cage connector (not shown) to couple to the edge connector 209 on the computer blade 105. The cage connector may also include an external second connector (not shown) that is electrically coupled to the computer blade 105 when the computer blade 105 is inserted into the slot 107. The external second connector may be further coupled to the connecting cables 151, 153, and 155 (shown in FIG. 1) for communication of the encoded human interface signals to a group of peripheral devices at a remote location. The use of the cage connectors (not shown) as an intermediate connection between computer blade 105 and the connecting cable 153 (shown in FIG. 1) may allow the removal and exchange of computer blade 105 without the need to disconnect the connecting cable 153 (shown in FIG. 1) from the cage 113. If the computer blade 105 fails, the computer blade 105 may be removed and a new computer blade (not shown) inserted in a slot, e.g., slot 107. As noted above, in one embodiment, when the computer blade 105 fails, the user's human interface, e.g., one or more peripheral devices, may be switched to a replacement computer blade (possibly in a manner that is transparent to the user), after which the failed computer blade may be removed and replaced.

FIG. 3—Computer Blade Components

Referring to FIG. 3, an embodiment of a computer blade 105 having a power supply 210, hard drive 208, and motherboard 207 is shown. The computer blade 105 may include elements that make up a standard PC, such as, but not limited to, a motherboard 207 with various components such as but not limited to a processor, e.g., a CPU 306, memory 304, and interface logic 302, which may include network logic 305, I/O logic 307, and interface logic 303, as well as other interface circuitry associated with a motherboard 207, configured on a single card. The network logic 305 may include a LAN or WAN connection, such as but not limited to a IEEE803.2 (10/100 BaseT) Ethernet, and circuitry for connecting to peripheral devices coupled to the computer blade 105. The computer blade 105 may be electrically coupled to the cage 113 (shown in FIG. 2) through the edge connector 209 that may face to the rear of the computer blade 105. In an embodiment of the invention, the computer blade 105 may slide into a slot 107 (shown in FIG. 2) of the cage 113 (shown in FIG. 2), making contact with the cage connector (not shown).

In one embodiment, the computer blade 105 may further include a network interface logic 305 included on a printed circuit board for interfacing to a network. The network logic 305 may encode network signals into a format suitable for transmission to the network. The network logic 305 may also receive encoded network signals from the network, and decode the encoded network signals. In one embodiment, the motherboard 207 may further include logic supporting PCI slot-based feature cards.

In one embodiment, the components on the computer blade 105 may be arranged from front to back for thermal efficiency. The interface logic 302 may be located at the rear of the computer blade 105, while the power supply 210 and hard disk 208 may be located at the front of the computer blade 105. In one embodiment, the computer blade 105 may have different slide drawer frame shapes, such as but not limited to square, rectangle, cubic, and three-dimensional rectangular forms. In one embodiment, the computer blade 105 may have components mounted on either side of the computer blade 105. The computer blade 105 may also have components mounted on both sides of the computer blade 105. If the slide drawer frame 205 has a three-dimensional shape, the components may be mounted on an inside surface and outside surface of the slide drawer frame 205.

FIGS. 4a, 4b, 4c, and 4d—Computer Blade Storage Patterns

Figure 4A:
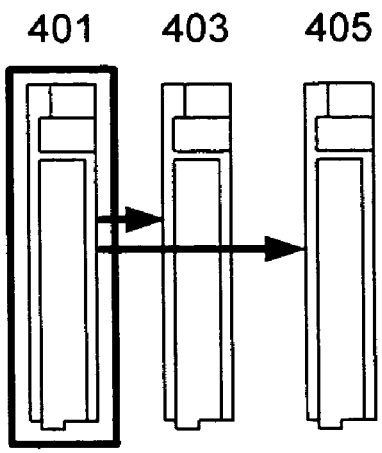
FIGS. 4a, 4b, 4c, and 4d illustrate computer blade storage patterns, according to one embodiment.

Referring to FIGS. 4a, 4b, 4c, and 4d, embodiments of computer blade storage patterns are shown for three computer blades 401, 403, and 405. It is noted that the systems shown in FIGS. 4a, 4b, 4c, and 4d are meant to be exemplary and are not intended to limit the system or method to any particular number of computers. As shown in FIG. 4a, in one embodiment, to prepare for a failure of computer blade 401, the information from a storage medium on the computer blade 401 may be copied (i.e., backed up) onto a storage medium on the computer blade 403. In one embodiment, a first portion of the information on the computer blade 401 may be located in the random access memory (RAM) of the first computer blade 401 and a second portion of the information may be located on a hard drive of the computer blade 401. Other locations of information from the computer blade 401 may also be within the scope of the invention. If the computer blade 401 fails or indicates a fail-over condition, a peripheral device coupled to the computer blade 401 through a peripheral switch may be switched over to the computer blade 403 through the peripheral switch, thereby enabling a user of computer blade 401 to continue accessing the information (originally) from computer blade 401 (but now on computer blade 403). In one embodiment, the information originating from computer blade 401 (and previously copied onto the storage medium of computer blade 403) may also be copied onto the storage medium of computer blade 405. The peripheral switch may also be operable to switch the peripheral device over to computer blade 405 in the event that both computer blades 401 and 403 fail. In another embodiment, upon detecting a fail-over condition of a processor in the computer blade 401, a backup processor may be switched over to the computer blade 401 to access and run off of the storage medium on the computer blade 401. In another embodiment, if the storage medium on the computer blade 401 fails, information from a backup computer blade may be copied over to a backup storage medium, and the components of the computer blade 401 may access the backup storage medium.

Figure 4B:
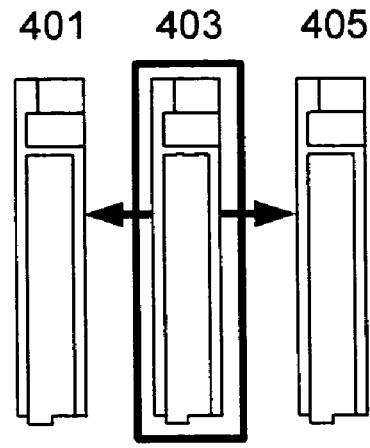
Figure 4C:
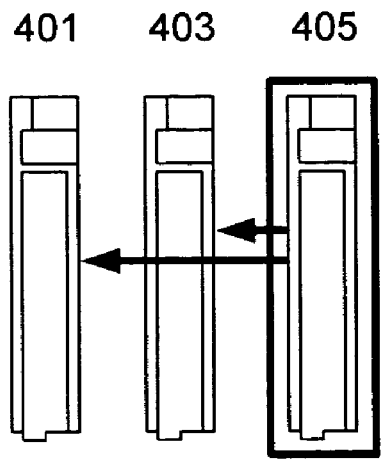

In one embodiment, shown in FIG. 4b, the information on the storage medium of computer blade 403 may be copied onto the storage mediums of computer blade 401 and 405. Similarly, in one embodiment, the information on the storage medium of computer 405 may be copied onto the storage mediums of computer blade 401 and 403, as shown in FIG. 4c. Thus, various of the computer blades may provide backup storage for one another.

In one embodiment, the computer blade 401 may detect and determine identities of one or more local computer blades, such as, but not limited to computer blades 403 and 405, on a subnet. Once detected, the computer blade identities may be stored and cached for later access on the computer blade 401. The detected computer blades to be used in backing up a computer blade may be assigned automatically or manually. In one embodiment, e.g., through an administration interface, computer blades may be assigned to each other at any time. A "replication factor" configuration value, may define how many other computer blades to send copies of the information on the computer blade to be backed up. For example, if computer blades 401, 403, and 405 form a subnet, the computer blade 405 may detect the computer blades 401 and 403 and then choose the computer blade 401 and the computer blade 403 as computer blades to send backups to. If the computer blade 405 has a fail-over condition, either the computer blade 401 or the computer blade 403 may be used to restore information to the computer blade 405, or used to send the information originating from the computer blade 405 to a replacement computer blade.

In one embodiment, the computer blades in one subnet may be backed up to computer blades on another subnet. For example, the computer blades in one subnet may be able to detect the computer blades in another subnet, and then the configuration of which computer blades are used to back up other computer blades between the two subnets may be performed, e.g., by an administrator or automatically. In one embodiment, a web based configuration interface may allow computer blades to be assigned or reassigned to remote computer blades, including blades on other subnets. Computer blades may backup with neighboring computer blades, computer blades in a same building, and/or computer blades in a remote location. In one embodiment, computer blades may be backed up to both geographically local computer blades and geographically remote computer blades. The local computer blades may provide quicker restoration on a replacement computer blade and remote computer blades may provide increased security and reliability.

For example, in one embodiment where information from a first computer blade is backed up onto both a local computer blade and a remote computer blade, if a fail-over condition occurs on the first computer blade, and the local computer blade with the backup is functional, backed up information can be copied to a replacement computer blade from the local computer blade without having to copy information from the remote computer blade. Copying information from the remote computer blade may take longer than from the local computer blade. If multiple computer blades at a site have a fail-over condition, (e.g., if both the first computer blade and the local computer blade with the backup fail) the remote computer blade may have a copy of the information from the first computer blade to copy to a replacement computer blade.

In one embodiment, several local computer blades may backup to a single remote computer blade. The local computer blades may also be backed up to other local computer blades. Having one remote computer blade to backup to may make the remote backups more manageable. The single remote computer blade handling multiple backups may be more powerful than a remote computer blade handling one backup. The remote computer blade may be managed through a web-based management interface. In one embodiment, the web-based management interface may be used by an administrator to schedule snapshots and manage configuration settings.

To optimize bandwidth during backups (especially remote backups), several factors including, but not limited to, the replication factor, the frequency of sending backup information to other computer blades, and the kind of connectivity that exists between the local and remote computer blades may need to be considered.

As mentioned above, in one embodiment, the information on computer blade 401 (and/or from other computer blades) may be backed up in a snapshot method in which all of the information to be copied is bulk copied at specified refresh times, where refresh times may indicate particular times to refresh (e.g., every hour on the hour, once per day at 3:00 a.m., etc.), or may indicate intervals between successive refreshes. For example, in one embodiment, a refresh time may be an hour such that the information is bulk copied from the first storage medium onto the second and/or third storage medium once per hour.

In another embodiment, a delta method may be used to copy the information from the first storage medium, where only a difference between a previous copy of the information copied to the second and/or third storage medium and the current information on the first storage medium is added to the second and/or third storage medium. The delta method may take less time to update but it is conceivable that space required on the storage medium of computer blade 403 may grow to very large proportions because the delta method may keep adding information without removing deleted information. The first time the delta method is used it may function analogously to the snapshot method because the initial copy may encompass all the information from the storage medium on the computer blade 401. In another embodiment, the growth of archived data is automatically managed by the "aging" feature which removes archives or deltas older than a user-defined time period.

In one embodiment, if the computer blade 401 regularly backs up to both the computer blade 403 and the computer blade 405, and the computer blade 405 becomes non-functional, the computer blade 401 may continue to backup to the computer blade 403. If the computer blade 401 is using a delta method, incremental backups on a computer blade may be tagged and archived. If the computer blade 405 becomes functional again, a peersync method may be used to update the last incremental backups from the computer blade 401 to the computer blade 405. For example, if the computer blade 401 backs up information from the computer blade 401 onto the computer blade 405 using a delta method, the computer blade 405 may have missed several incremental backups (i.e. backups covering changes in information on the computer blade 401 since the last backup.) To update the computer blade 405, when the computer blade 405 becomes functional, the computer blade 401 may send the computer blade 405 a catalog of past incremental backups. The computer blade 405 may compare the catalog to the incremental backups the computer blade 405 currently has and then query the computer blade 401 for the incremental backups the computer blade 405 needs to become current. In one embodiment, an archive of the past incremental backups may be sent along with the catalog, and the computer blade 405 may not query the computer blade 401 for the incremental backups. Instead, the computer blade 405 may pull the needed incremental backups from the archive.

In one embodiment, information being written to the storage medium of the computer blade 401 may also be written to the computer blade 403 at substantially the same time. In other words, rather than backing up the information after it has been written to computer blade 401, the information writes may be performed effectively in parallel, or at least in conjunction. If the computer blade 401 fails, the peripheral switch may switch the peripheral device over to the computer blade 403. In one embodiment, the information on the storage medium on computer blade 403 (which may mimic or replicate the information on the storage medium of the failed computer blade 401) may be copied onto the computer blade 405. The peripheral switch may switch the peripheral device from the computer blade 401 over to the computer blade 405. Thus, in this example, although the information of computer blade blade 401 was backed-up on computer blade 403, computer blade 405 is used as the replacement computer blade, and so the backed-up information is copied to computer blade 405 and the peripheral device switched from the failed computer blade 401 to the replacement computer blade 405.

Figure 4D:
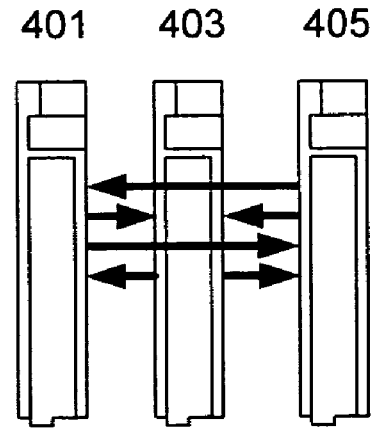

In one embodiment, as shown in FIG. 4d, the hard drives on the computer blades 401, 403, and 405, such as, but not limited to, hard drive 208 shown in FIG. 3) may share memory space using a virtual network storage space (VNAS) system incorporating a decentralized peer-to-peer sharing process. Information stored on the computer blade 401 may also be stored on computer blades 403 and 405. If the computer blade 401 fails, a peripheral switch may switch a peripheral device from computer blade 401 over to computer blade 403. For example, computer blade 403 may then access the information originally stored on or associated with the computer blade 401 from the storage medium of computer blade 403 and the third storage medium of computer blade 405. In other words, the information originally stored on the failed computer blade 401 may be distributed over the computer blades 403 and 405, but may be accessible (to replacement computer blade 403) as if stored on a single (virtual) storage medium. In another embodiment, the (backed-up) information stored on the computer blades 403 and the 405 may be organized (e.g., copied) onto the replacement computer blade 403 to have the information from the failed computer blade 401 collected onto one computer. The peripheral switch may then switch the peripheral device from the first computer over to the computer with the organized or collected copy.

In one embodiment, failure management software may execute to redirect information reads and information writes directed at the failed hard drive to an operating hard drive until a replacement computer or replacement hard drive is brought into service. In one embodiment, the backup copy of the lost information may already be on a replacement disk. As noted above, in one embodiment, the entire process is transparent to the user, i.e., the user may not notice the failure of the computer blade.

Referring back to FIG. 4a, in one embodiment of a topology for the computer blades 401, 403, and 405, the computer blades 401, 403, and 405 may use failure information backup in a virtual network attached storage (VNAS) system. In one embodiment, the information may exist in multiple locations across the VNAS system composed of computer blades 401, 403, and 405, such that an occurrence of a failed computer blade 403 does not result in the loss of vital information from the failed computer blade 403. Other information backup strategies may also be within the scope of the invention to ensure information redundancy. For example, other RAID (Redundant Array of Inexpensive Disks) levels may be used.

In one embodiment, an underlying distributed computer infrastructure (DCI) may be used to distribute resources among the computer blades. DCI is further described with reference to FIGS. 23 and 24. Each computer blade may be assigned a number of "peer" or neighbor computer blades that may be used to backup information from the storage medium of a computer blade. "Peer" computer blades, such as, but not limited to, computer blades 403 and computer blade 405, may be assigned to a nearby computer blade 401. In one embodiment, computer blades may be backed up onto computer blades at a remote location. For example, multiple groups of computer blades at multiple locations may be backed up to a one or more central locations, such as, but not limited to disaster recovery centers, with replacement computer blades. In one embodiment, backups to the disaster recovery center may be scheduled so that multiple groups of computer blades can coordinate their backups. In one embodiment, a disaster recovery system may provide a central location for a group of moving computer blades to use for initialization. For example, several moving field hospitals using computer blades with the same set of programs and user preferences may initialize their computer blades from a central location of computer blades.

Figure 5:
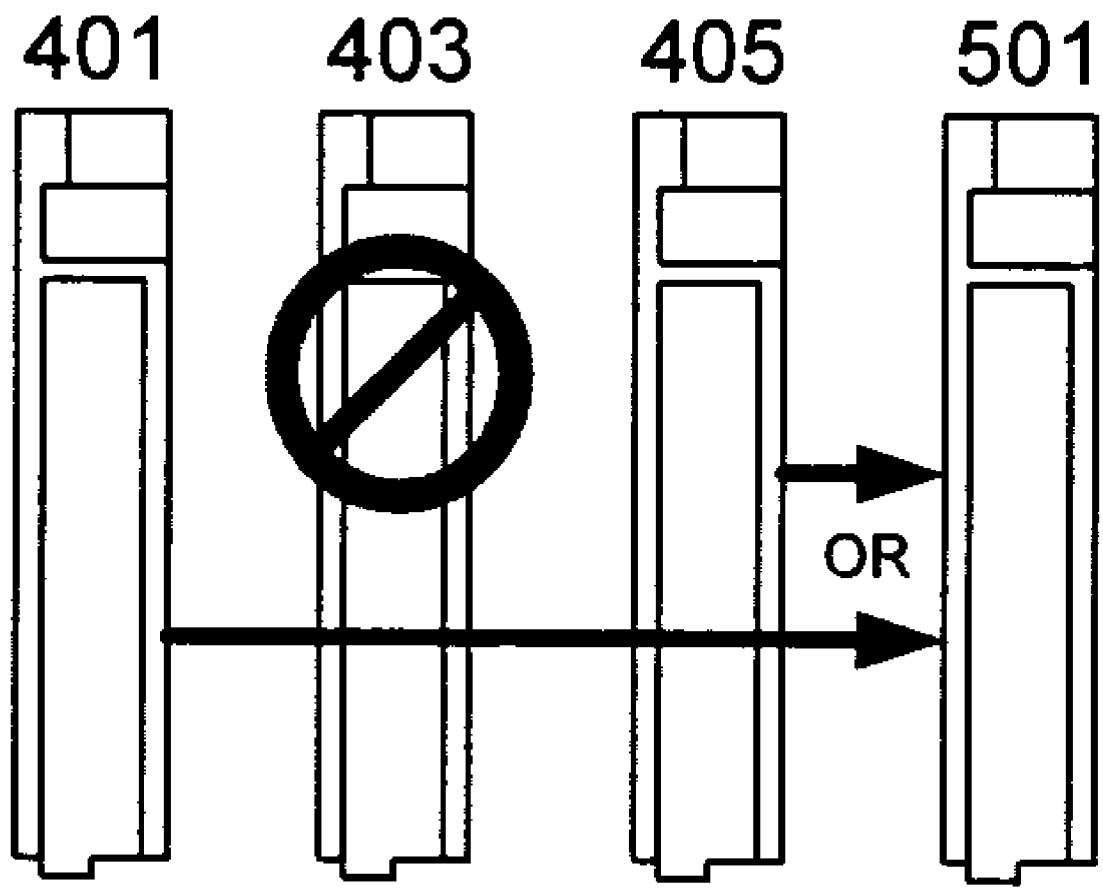
FIG. 5 illustrates a failed computer blade restored onto a backup computer blade, according to one embodiment.

FIG. 5—Restoring a Failed Computer Blade Onto a Backup Computer Blade

Referring to FIG. 5, an embodiment of restoring or rebuilding a failed computer blade's functionality (e.g., computer blade 403) onto a backup computer blade (e.g., computer blade 501) is shown. For example, the failed computer blade 403 may have a fail-over condition such as a fatal hard drive crash or a short-circuit on the motherboard 207. In one embodiment, rebuilding a desktop experience (for a user of the failed computer) may include identifying a replacement computer blade 501 to use, switching via the connector cable 153 (shown in FIG. 1) to the user's desktop connector, and loading failed computer blade information from either the first computer blade 401 or (assuming a previous backup to computer blade 405) from third computer blade 405. In one embodiment, the fail-over condition of computer blade 403 may be detected and signaled automatically by computer blade 403, or by computer blades 401 and/or 405. Other signals and other sources may also be within the scope of the invention.

In one embodiment, the information originating from the computer blade 401 (to be copied to another computer blade for backup) may include user preferences. Including the user preferences with the information to be copied to another computer blade 403 may enable a move manager application and/or a switch manager application (or equivalent) to seamlessly provide a replacement computer blade (e.g., computer blade 501) with a similar look, feel, and functionality as a computer blade that has a fail-over condition. The move manager, as discussed below, may implement the transfer of information from one computer blade to another computer blade. The switch manager application may implement switching a first peripheral from a first computer blade to a replacement computer blade.

In one embodiment, the fail-over condition of computer blade 403 may be signaled manually, such as by a user calling a system administrator. In one embodiment, reconnecting a user's peripheral devices, e.g., keyboard 123 (see FIG. 1), mouse 125, and monitor 127, may include identifying replacement computer blade 501, loading the failed computer blade 403 information onto the replacement computer blade 501 from either the first computer blade 401 or the third computer blade 405, and establishing a connection between the user's peripheral devices and the replacement computer blade 501, such as via a soft switch (not shown). In one embodiment, while the information is being restored to the replacement computer blade 501, information reads and information writes from and to the failed computer blade 403 may be diverted to the replacement computer blade 501 so that a user's productivity is not interrupted. In one embodiment, a replacement computer blade 501 may have the standard operating system and applications already stored on it. When a fail-over condition occurs with a user's computer blade, the peripheral device for the user's computer blade may be switched over to the replacement computer blade and the user may begin using the applications already stored on the replacement computer blade. Backup information may be restored to the replacement computer blade in the background, and while the user uses applications already stored on the replacement computer blade, writes the user performs may be diverted to the replacement computer blade.

In one embodiment, information may be copied onto a backup computer after a fail-over condition has been detected. For example, as noted above, first computer 401 may have a first processor and a first storage medium coupled to the first processor. The first storage medium may be a medium including but not limited to a random access memory and a hard disk drive. Second computer 403 may have a second processor and a second storage medium coupled to the second processor. A communication link, e.g., a bus (not shown), may couple the first computer 401 to the second computer 403. In addition, a peripheral switch may be coupled to the first computer 401 and the second computer 403 and may route signals from a human interface, such as but not limited to a first peripheral device coupled to the first computer 401, to the first computer 401 through a peripheral device port coupled to the first computer 401.

In one embodiment, the second storage medium on the second computer 403 may store program instructions executable by the second processor to detect a fail-over condition of the first computer 401 and copy information from the first storage medium onto the second storage medium, thereby making the information accessible by the second processor. Part of or substantially all of the information on the first storage medium may be copied onto the second storage medium. The peripheral switch may be configured to route signals between the first peripheral device and the second computer to make the second processor and the second storage device accessible by the first peripheral device. In one embodiment, copying information from the first storage medium to the second storage medium and routing signals from the first peripheral device to the second processor may occur without user input to trigger the copying and routing, i.e., the data fail-over process may be performed programmatically. Therefore, the copying and re-routing may be transparent to a user of the first computer 401. Thus, in one embodiment, the peripheral switch may switch the signals from the first peripheral device targeted to the first computer 401 over to the second computer 403 without a user input to trigger the switching. In another embodiment, if the first storage medium fails, the first processor may simply access the second storage medium (e.g., of the second computer 403) instead of switching the first peripheral device to the second processor (e.g., the second computer blade 403). In one embodiment, if the first processor has a fail-over condition, but the first storage medium is still functional, the second processor may simply access the first storage medium and the first peripheral switch may be switched over to the second processor.

In one embodiment, the storage medium on the second computer 403 may store program instructions executable by the second processor to copy information from the first storage medium onto the second storage medium to make the information accessible by the second processor before the second processor detects a fail-over condition of the first computer 401. Part of or substantially all of the information on the first storage medium may be copied onto the second storage medium, where the information may be stored (and optionally updated) until a fail-over condition (of the first computer 401) is detected.

In one embodiment, the information may be stored on additional storage mediums, e.g., in case the second computer also has a failure, e.g., a hard disk crash. In one embodiment, the information from the first storage medium may be repeatedly copied onto the second storage medium to keep the information on the second storage medium current with the current state of the first storage medium. For example, in one embodiment, the information on the first storage medium may be copied over the previously copied information from the first storage medium on the second storage medium. In another embodiment, the information from the first storage medium may be initially copied onto the second storage medium, and then subsequent changes to the information on the first storage medium may be stored onto the second storage medium over time. The information on the first storage medium may then be reconstructed using the initial copy stored and the subsequent changes. Periodically, the initial copy and subsequent changes may be overwritten with a new copy of the information on the first storage medium, e.g., to prevent the stored subsequent changes from filling up the second storage medium.

In one embodiment, the first storage medium may also use space on the second storage medium to store information not stored on the first storage medium, e.g., may use the space for purposes other than backup. The first computer 401 may keep a record of the location of the extra information stored on the second storage medium. In one embodiment, the information from the first computer 401 may also be stored on other storage mediums, e.g., on other computers. For example, if the first storage medium is running out of space, it may use space on the second storage medium or other storage mediums to save information to, thus using other computers' storage mediums for overflow. In one embodiment, the information on or originating from the first storage medium may be striped onto other storage mediums. In addition, information from the second storage medium may be copied onto the first storage medium and/or other storage mediums in case the second computer fails or the second computer needs additional space to store its information.

In one embodiment, a third computer 405 including a third processor and a third storage medium coupled to the third processor may also be coupled to the communication link. The third storage medium may store program instructions executable by the third processor to copy (i.e., backup) information from the first storage medium onto the third storage medium. The program instructions may be further executable by the third processor to detect a fail-over condition of the first computer 401, and to copy information from the third storage medium to the second storage medium so that the information is accessible by the second processor. The peripheral switch may then operate to route signals between the first peripheral device and the second processor if the first computer 401 fails.

In another embodiment, the third storage medium may not be comprised in the third computer, e.g., computer 405, but may be coupled to the communication link as a substantially independent networked resource. In this embodiment, the second computer 403 may copy information from the first storage medium (e.g., from the first computer 401) onto the third storage medium. Thus, the second computer 403 may backup information from the first computer 401 onto the third storage medium. After a fail-over condition of the first computer 401 is detected, information from the third storage medium (that was originally on the first computer 401) may be copied to the second storage medium to make the information accessible by the second processor, i.e., by the replacement computer 403. The peripheral switch may then route the signals from the first peripheral device to the second computer 403.

Figure 6:
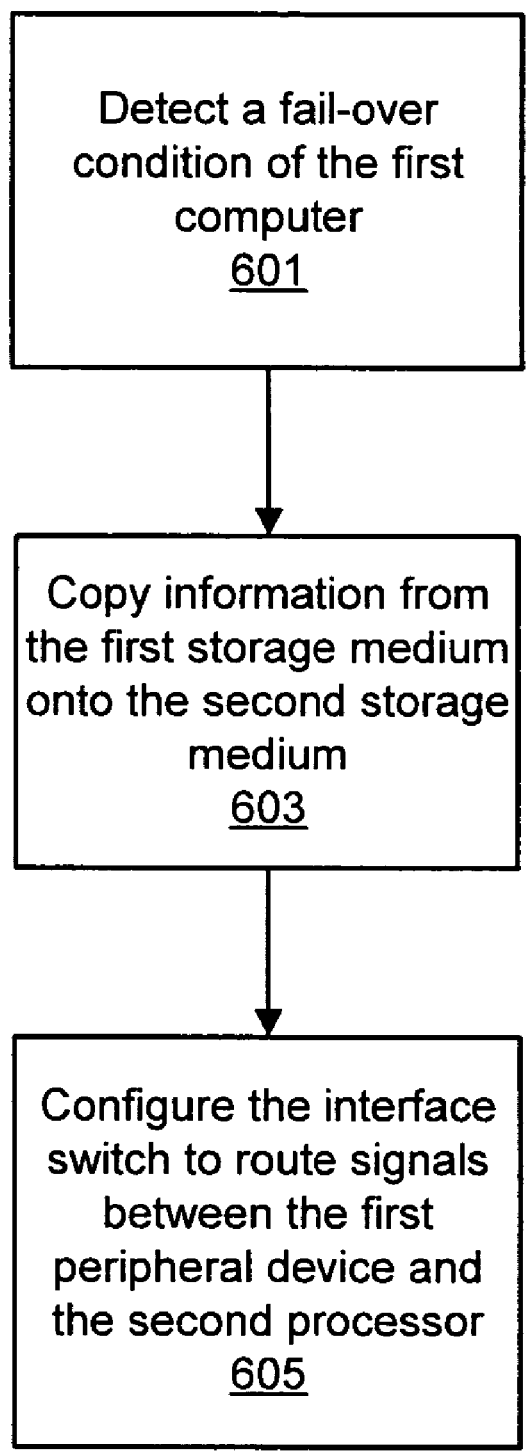
FIG. 6 illustrates an embodiment of a flowchart for restoring a failed computer by copying after a failure is detected.
Figure 7:
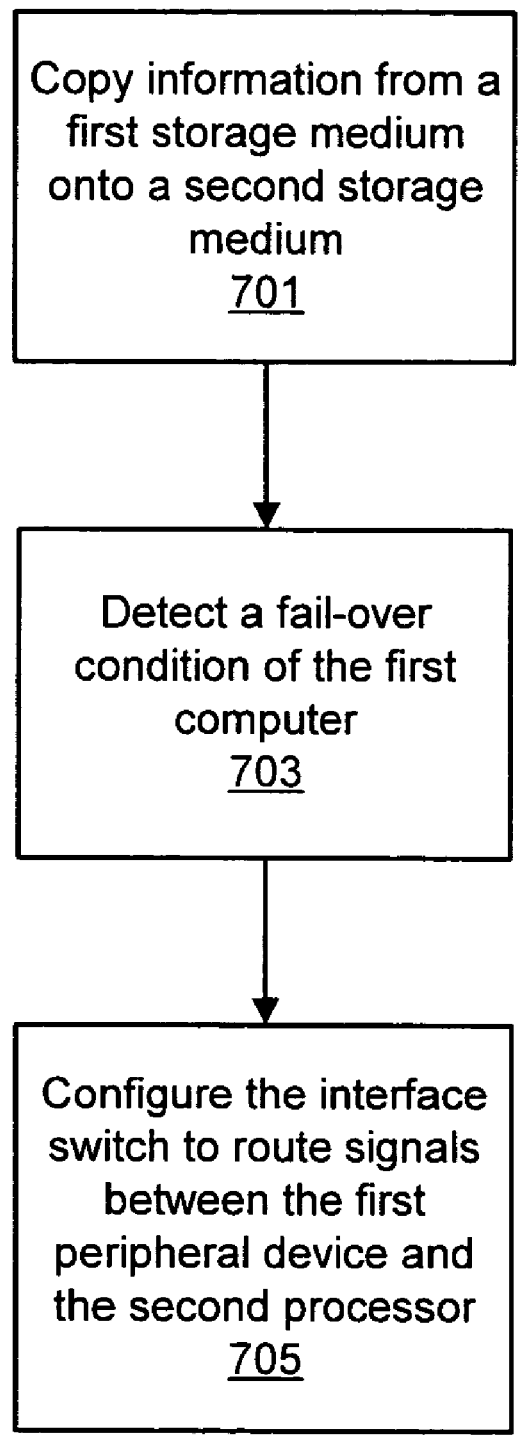
FIG. 7 illustrates an embodiment of a flowchart for restoring a failed computer by copying before a failure is detected.
Figure 8:
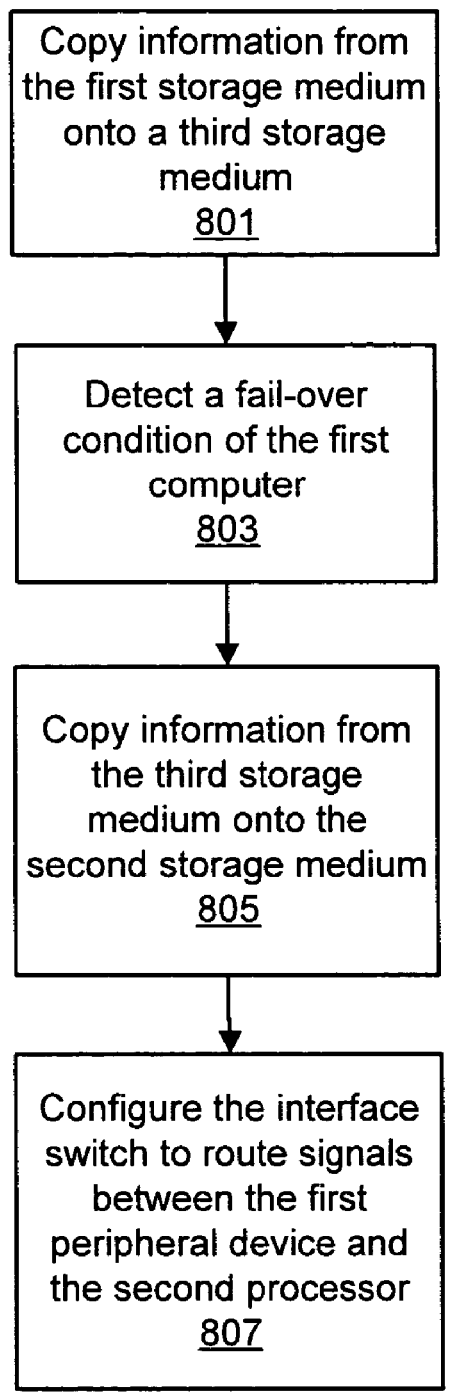
FIG. 8 illustrates an embodiment of a flowchart for restoring a failed computer by copying from a third storage medium.

FIGS. 6-8—Flowcharts of Methods for Responding to a Fail-Over Condition

FIGS. 6 through 8 are flowchart diagrams of various methods for responding to a detected fail-over condition. Various embodiments of the methods described below may be implemented in accordance with any of the systems described above, where a first computer, including a first processor and a first storage medium coupled to the first processor, couples to a first peripheral device via a peripheral switch, where the peripheral switch may be configured to route signals between the first peripheral device and the first computer. A second computer, including a second processor and a second storage medium coupled to the second processor, may be coupled to the first computer via a communication link, as described above. The storage medium of the first and/or the second computer may store program instructions executable by the first and/or second processor to implement various embodiments of the methods described below. As also described above, in some embodiments, other computers, e.g., a third computer, may also perform all or portions of the methods described herein. It should be noted that in various embodiments of the methods described below, one or more of the steps described may be performed concurrently, in a different order than shown, or may be omitted entirely. Other additional steps may also be performed as desired.

As FIG. 6 shows, in 601, a fail-over condition for the first computer may be detected, for example, regarding the first processor or the first storage medium, although the fail-over condition may relate to any other components or subsystems of the first computer. As mentioned above, the fail-over condition may indicate a failure of the respective component, or may indicate that such a failure is likely or imminent, although in this particular embodiment, the fail-over condition does not include an actual failure of the first storage medium, since information is copied therefrom after detection of the fail-over condition. The detection process generally involves some type of monitoring of the first computer. For example, various metrics may be determined that indicate a fail-over condition, such as, for example, read/write error rates, operating temperatures, and so forth, and these metrics may be monitored to detect the fail-over condition. Of course, in various embodiments, the monitoring process may be performed by the first computer itself, or by any other computers coupled to the first computer, as desired.

In 603, information stored on the first storage medium may be copied onto the second storage medium, thereby making the information accessible by the second processor. For example, in a situation where the first processor fails the second computer may access the first storage medium and copy at least a portion of its contents to the second storage medium, after which the second processor, i.e., the second computer, may access the information. As another example, if the fail-over condition is due to an imminent failure of the first storage medium, the second computer may access the first storage medium and attempt to copy the desired portion of its contents to the second storage medium, after which the second processor may access the information, although it is noted that in some cases the storage medium may fail before all of the desired information has been copied.

Finally, once the information has been copied to the second computer, then in 605, the peripheral switch may be configured to route signals between the first peripheral device and the second computer. The first peripheral device may then access the second processor and the second storage medium. It should be noted that although the method described refers to the first peripheral device being switched from the first computer to the second computer, in preferred embodiments, a plurality of peripheral devices, i.e., human interface devices composing a human interface, are coupled to the first computer, and are subsequently switched by the peripheral switch to the second computer. Thus, the peripheral switch may operate to switch the entire human interface of the first computer to the second computer.

Thus, in the embodiment of FIG. 6, the information stored on the first computer may be copied to the replacement computer (i.e., the second computer) after detection of the fail-over condition. It is noted that this approach may make transparency of the process to the user problematic, in that there may be a noticeable delay between the detection of the fail-over condition and resumption of operations using the replacement computer.

In the embodiment shown in FIG. 7, actions are taken prior to detection of the fail-over condition that may significantly improve, i.e., decrease, the time it takes to resume user operations with the replacement computer. In other words, compared to the method of FIG. 6, the expected downtime for the user may be substantially reduced.

As FIG. 7 shows, in 701, information from the first storage medium may be copied onto the second storage medium to make the information from the first storage medium accessible by the second storage processor. In other words, information stored on the first storage medium may be backed-up onto the second storage medium. In various embodiments, this backup operation may be performed by the first computer, by the second computer, or by another computer, e.g., the third computer.

In 703, a fail-over condition may be detected for the first computer, e.g., related to the first processor and/or the first storage medium (or any other component of the first computer). It is noted that in various embodiments, the detection of the fail-over condition may be performed by various of the computers in the system, e.g., by the first, second, and/or third computers.

In response to the detection of the fail-over condition, in 705, the peripheral switch may operate to route signals between the first peripheral device and the second computer. The first peripheral device may then access the second processor and the second storage medium. In other words, the peripheral switch may switch the human interface of the first computer over to the second computer, as described above.

Thus, in the embodiment of FIG. 7, because the information is backed-up to the second computer, i.e., the replacement computer, prior to the fail-over condition, once the fail-over condition for the first computer is detected, the switchover from the first computer to the replacement computer may occur substantially immediately, i.e., with minimum delay. Thus, in this embodiment, transparency to the user of the switchover process may not be difficult to achieve.

In the embodiment shown in FIG. 8, the third computer, including the third processor and third storage medium is coupled to the first and second computers via communication link.

As shown in FIG. 8, in 801, information from the first storage medium may be copied onto the third storage medium. In other words, information stored on the first storage medium may be backed-up onto the third storage medium. As noted above, in various embodiments, this backup operation may be performed by the first computer, second computer, the third computer, or yet another computer included in the system.

In 803, a fail-over condition may be detected for the first computer, e.g., related to the first processor and/or the first storage medium (or any other component of the first computer). As mentioned above the detection of the fail-over condition may be performed by various of the computers in the system, e.g., by the first, second, and/or third computers (or others).

In response to the detection of the fail-over condition, in 805, the information from the first storage medium may be copied from the third storage medium onto the second computer, i.e., onto the second storage medium, to make the information accessible by the second processor. In other words, the information may be copied from the backup computer (the third computer) to the replacement computer (the second computer).

Finally, in 807, the peripheral switch may be configured to route signals between the first peripheral device and the second computer (the replacement computer). The first peripheral device may then access the second processor and the second storage medium (and may be accessed by the second processor).

Similar to the embodiment of FIG. 7, this embodiment includes backing up the information stored on the first computer (to the third computer) prior to detection of the fail-over condition, and thus may facilitate transparency of the process from the user's perspective.

Resource Manager

Various embodiments of the methods described above with reference to FIGS. 6-8 may be performed by a resource manager. In other words, some or all of the storing, monitoring, detecting, and configuring may be performed or managed by the resource manager. Additionally, the resource manager may be operable to manage the VNAS system in one embodiment. The resource manager may be operable to manage the plurality of computers and associated peripheral devices. In one embodiment, the resource manager may be located on one of the computer blades. In another embodiment, a copy of the resource manager may operate on each of the computer blades. In yet another embodiment, the resource manager may be distributed across the plurality of the computer blades. In each of these embodiments, the resource manager, or resource managers, may operate to schedule efficient information storage among the plurality of computer blades, e.g., computer blades 401, 403, and 405.

In one embodiment, the resource manager may operate to monitor resource usage for each of the plurality of computers. In other words, the resource manager may monitor performance metrics for each computer such as a total memory size, a used memory size, a virtual memory size, peripheral type, available ports, processor type, processor speed, type of installed applications, whether a user is logged in, frequency of login ins, percentage of usage of CPU, percentage of usage of hard disks, network hardware installed, network usage, usage of installed applications, video specifications, usage of CD-ROM, a variable imparted by the operating system, and a variable imparted by the BIOS, among others.

In one embodiment, the resource manager may function both as an analyzer and a controller for the system. As an analyzer, the resource manager may utilize information about the performance and use patterns of each of the plurality of computers. Based on the performance and use patterns, the resource manager may compute demand and usage metrics or issues (e.g., processor time, memory usage and demand, hard drive memory, and network information). The resource manager may also generate reports on applications and links used by the system. These patterns may be used to generate a map of the demands on the system's collective resources over time. The continually updated map may be used by the system administrator and/or the resource manager in order to perform predictive and proactive scheduling of resources to users. Other uses of the map may also be within the scope of the invention.

FIGS. 9-14—Screen Shot Embodiments of Various Interfaces

In one embodiment, software used to manage functions such as, but not limited to, assignment of computer blades to other computer blades for backup, detecting a fail-over condition in a computer blade, and managing the copy process from a backup computer blade to a replacement computer blade, may be installed and managed using a graphical installation program. In one embodiment, installation may be performed by a computer blade local administrator. The installation program may be restricted to administrator access because the installation program may require system resources to which only the administrator may have access. However, other installers are also contemplated. While various embodiments of screens and interfaces are shown, it noted that other screens and interfaces may also be within the scope of the invention.

Figure 9:
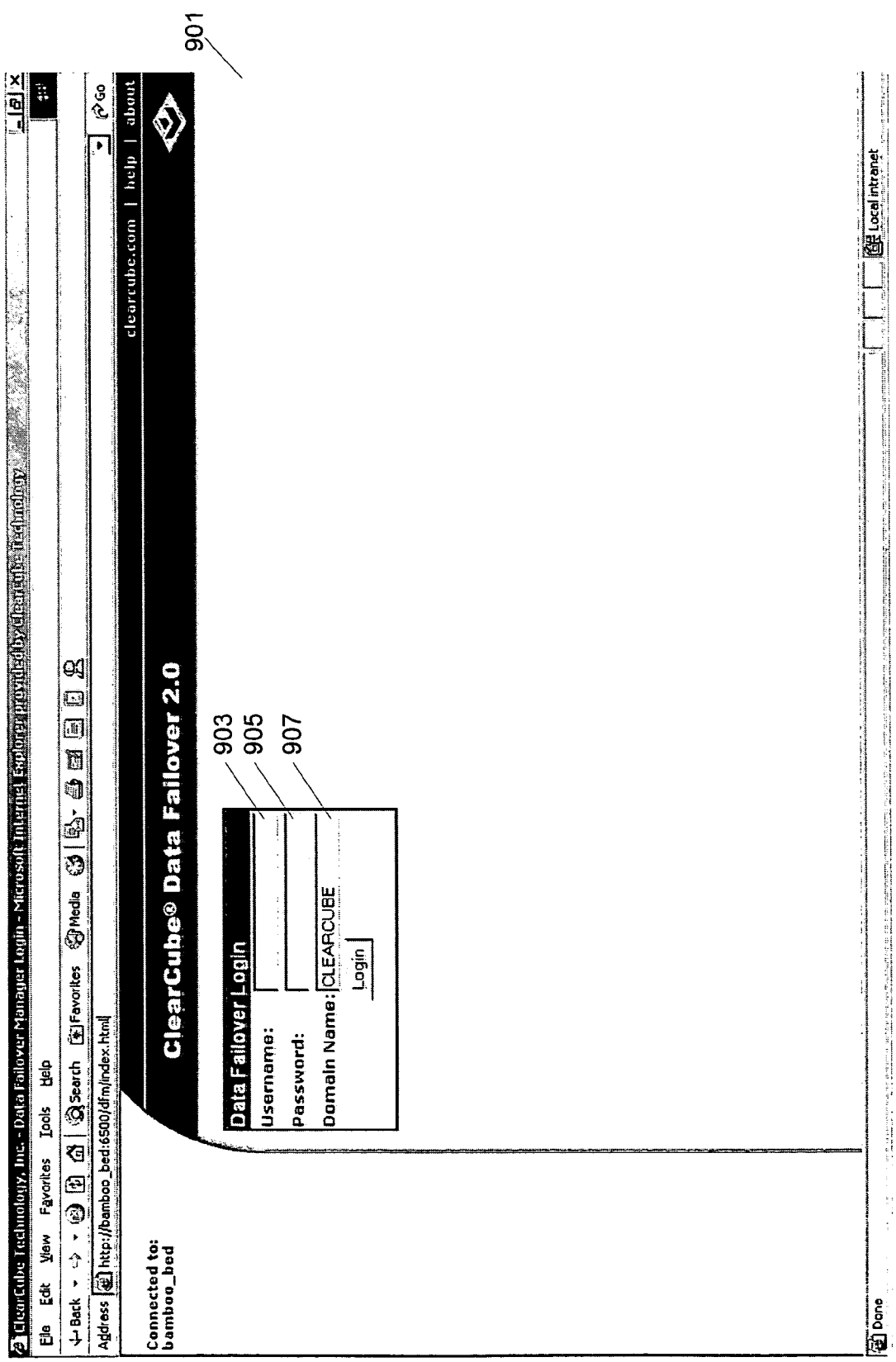
FIG. 9 illustrates a login screen of a management console, according to an embodiment.

FIG. 9—Screen Shot of a Login Screen

FIG. 9 illustrates an embodiment of a login screen 901 of a management console, e.g., a web-based management interface. The login screen 901 may appear before a management session is started. In one embodiment, to enter the management console, a user may need domain administration rights. A login may be validated through a primary domain controller. A username 903 and password 905 may be registered with a network to validate users on the management console. The user may supply a username 903, password 905, and a domain name 907, although other user inputs are also contemplated. Once the username 903, password 905, and domain name 907 are authenticated, the user may be automatically redirected to a management console main menu or screen, described below.

Figure 10:
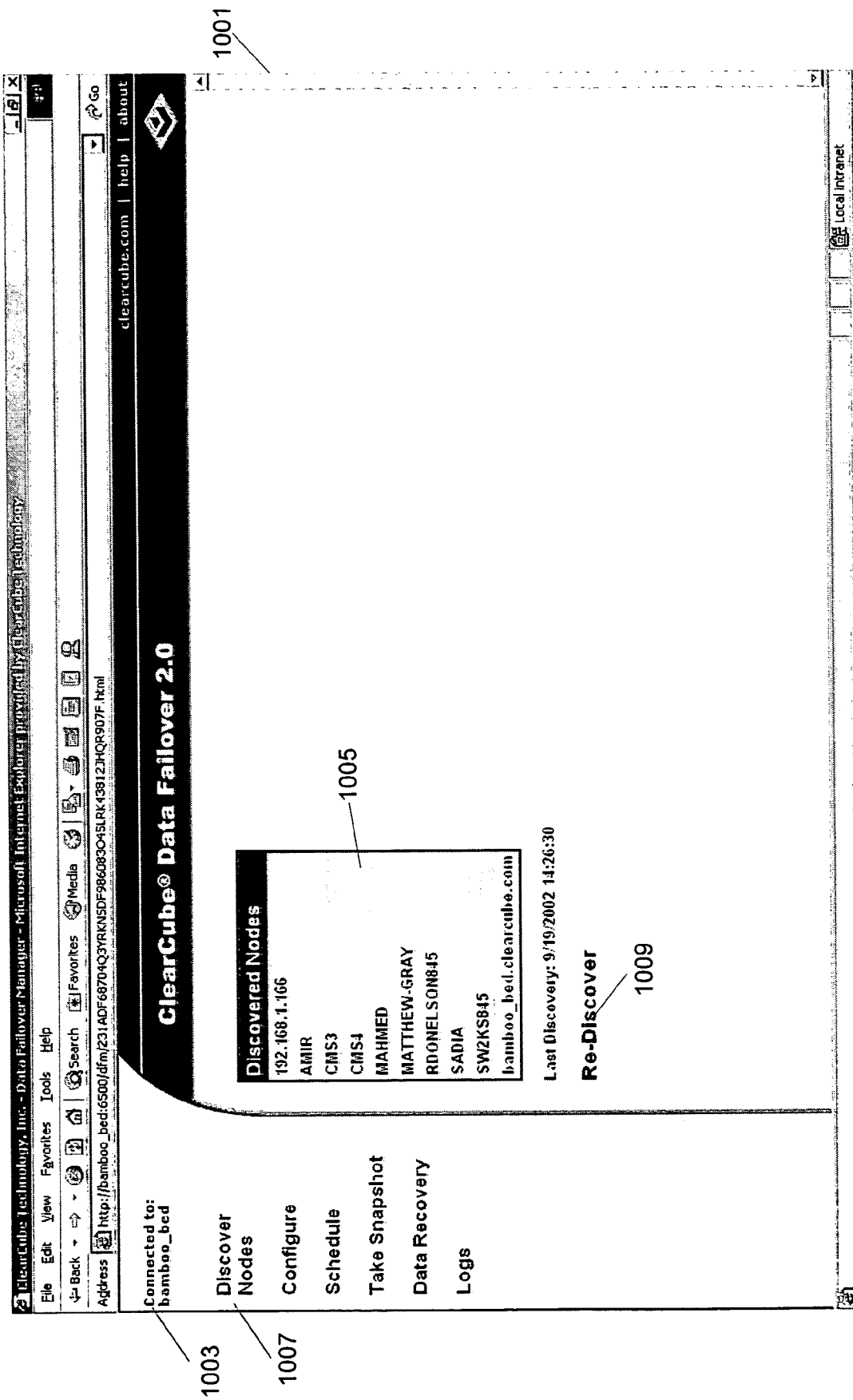
FIG. 10 illustrates a main screen in a web-based management interface, according to an embodiment.

FIG. 10—Screen Shot of an Auto-Discovery Screen

FIG. 10 illustrates an embodiment of a main screen in a web-based management interface such as may be used in various embodiments of the resource manager. For example, the main screen shown FIG. 10 illustrates an auto-discovery screen 1001 showing a list 1005 of computer blades on a local subnet. In embodiment, clicking on a name of a computer blade may load the management interface with information about that computer blade. In the embodiment shown, an indicator 1003 in the top left hand corner of the main screen displays the name of the computer blade to which the administrator is currently connected (e.g., a computer blade named swlab1). When management software is first installed on a computer blade, the administrator or user may click 'Discover Nodes' 1007, and if no computer blade names appear, the administrator or user may click "Rediscover" 1009 to get a list of computer blade names.

Figure 11:
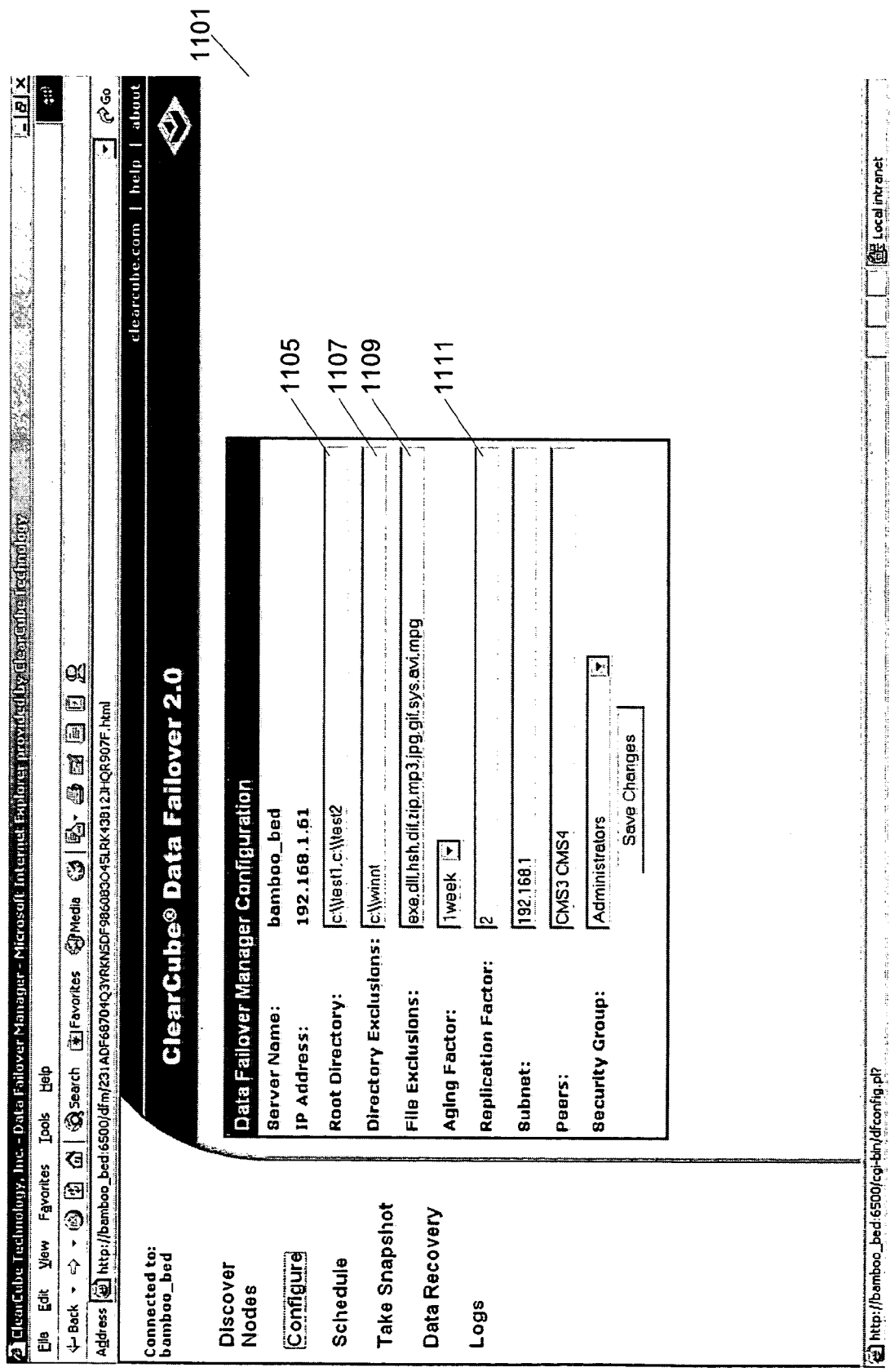
FIG. 11 illustrates a configuration screen, according to an embodiment.

FIG. 11—Screen Shot of a Configuration Screen

FIG. 11 illustrates an embodiment of a configuration screen 1101. A parameter indicating a location of a configuration file for a backup computer. In various embodiments, the configuration file for each respective computer may have a standard location on that computer (e.g., the administrator may not need to determine the location of each configuration file on each computer when performing data fail-over). In one embodiment, a root directory 1105 may list the location on a storage medium that may be considered as a starting point for a backup process, including, but not limited to, archiving. A subdirectory may be included in the root directory 1105 for the backup process. In one embodiment, an optimum setting for the parameter may point to or indicate the location of preferences file (e.g. a Microsoft™ Windows Documents and Settings) folder to backup user information and preferences for local users of a computer blade. A replication factor 1111 may define how many peers to send local information to and may be used to automatically assign the appropriate number of other computer blades to the local computer blade. A directory exclusion list 1107 may list the names of directories that are not to be included in the backup process, even if they are subdirectories of the root directory. The directory exclusion list 1107 may explicitly exclude system or binary folders that may be unnecessary to backup. File exclusion 1109 may indicate a comma-delimited list of extensions (e.g., .exe, .mpg, etc.) that may not be backed up. The comma-delimited list may include .mp3 or other rich media files that may not be important enough to warrant backup.

Figure 12:
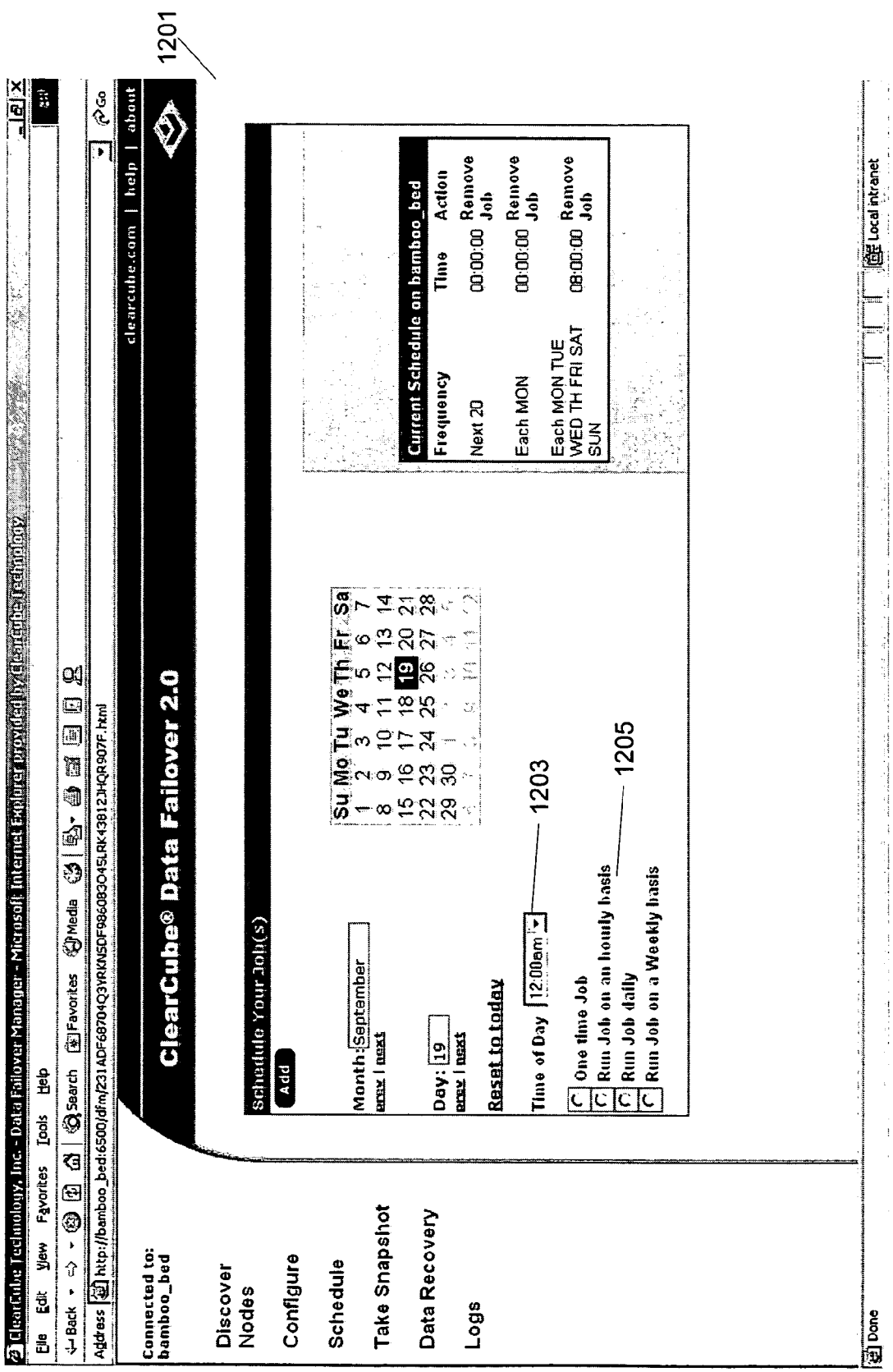
FIG. 12 illustrates a screen for a scheduling interface, according to an embodiment.

FIG. 12—Screen Shot of a Scheduling Interface

FIG. 12 illustrates an embodiment of a screen for a scheduling interface 1201. A time-of-day drop down list 1203 and a frequency drop-down list 1205 may allow a time and frequency to be scheduled. An added time in the time-of-day drop down list 1203 may be added or removed. In one embodiment, a "weekly" frequency schedule may also be entered. For example, if "6 am, weekly" is entered into the "weekly" frequency, the backup may be taken once a week at 6 am. Frequent backups may cause increased network activity. However, in one embodiment, if a delta method of backup is used, only files changed from the last backup may be archived and sent. In addition, in environments where files are not changing very frequently, very frequent snapshots may not be needed.

Figure 13:
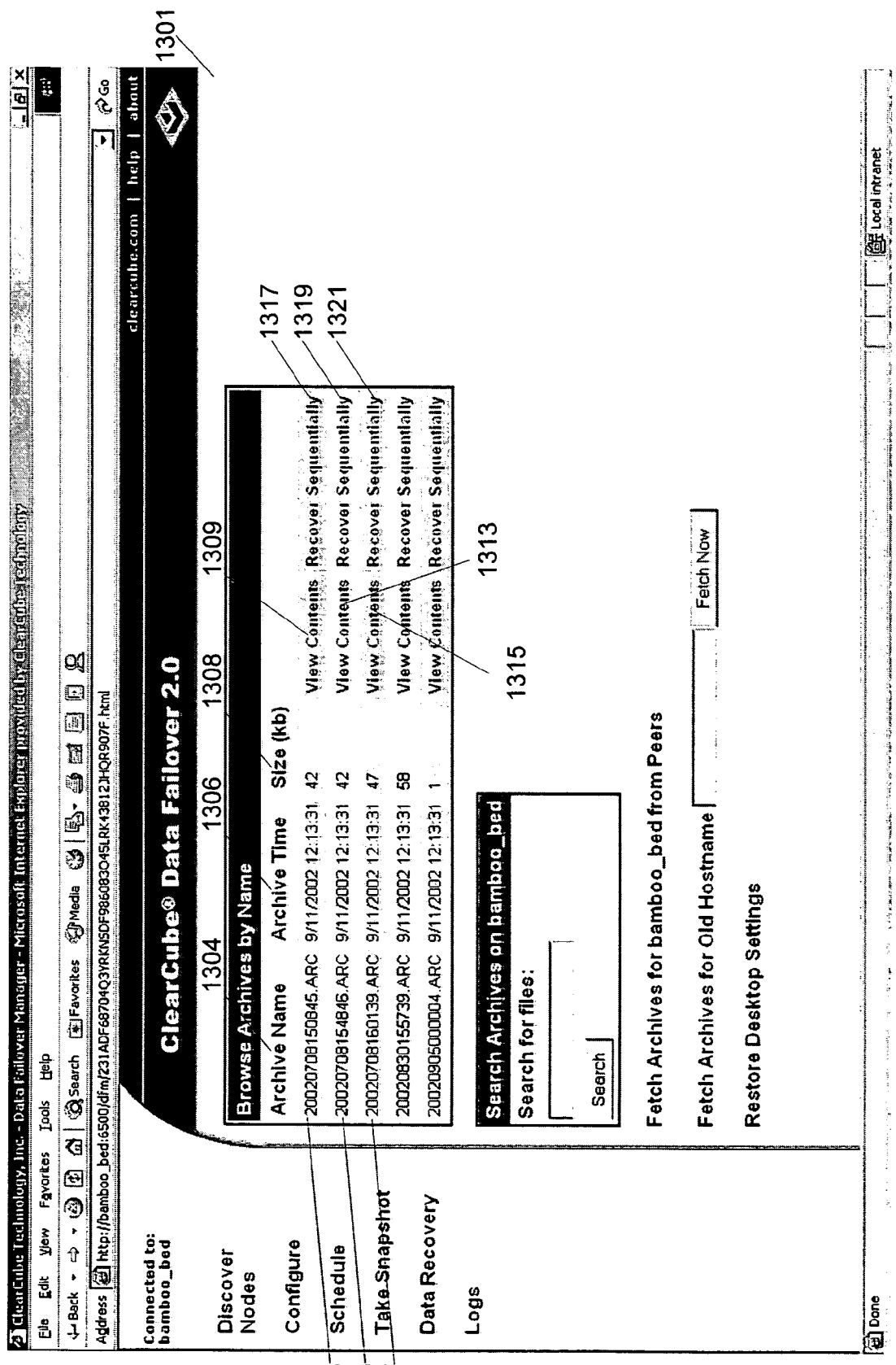
FIG. 13 illustrates an information recovery view, according to an embodiment.

FIG. 13—Screen Shot of an Information Recovery View

FIG. 13 illustrates an embodiment of an information recovery view 1301. In the example shown, three archives, each representing a file or set of files in a backup, may be listed in archive contents listings 1303, 1305, and 1307, along with sizes 1308, names 1304, and time of each archive 1306. In one embodiment, a "View Contents" button 1309, 1313, and 1315 may be placed next to each entry. The "View Contents" button 1309, 1313, and 1315 may be clicked to view contents of each archive. A next button may control sequential restoration. For example, each archive may represent changes between two points in time (e.g., an archive created at 12 p.m. may represent changes that occurred to files between the time of a last backup at 10 p.m. and 12 p.m.). The backups may be used to restore a computer blade to the last archived state of the computer blade, or the backups may be used for controlled rollbacks to earlier versions. The backups may be used for controlled rollbacks if addition of some information to the backup resulted in the corruption of important files or documents.

In one embodiment, when the "Recover Sequentially to this archive" button 1317, 1319, and 1321 is clicked for a particular archive in a backup, the button may cause a restoration of each archive up to and including the selected archive. For example, if archives A, B, C, D, E, and F, are displayed (not shown), clicking on archive D may result in A, B, C and D being restored to a replacement computer blade. However, if there are additional archives, E and F, they will not be restored. The administrator may return to this view and choose further restoration for E, or both E and F. In addition, in one embodiment, the restoration to a replacement computer blade may be non-destructive. In other words, though the restoration may overwrite existing files when their names clash with files present in a restored archive, the restoration may not delete files that do not exist at all in the restored archives. For example, if files X, Y and Z are present in a next archive to restore to a replacement computer blade in a sequential restoration, and prior to restoring the next archive, older versions of X and Y, and a completely different file, W, have already been copied over to the replacement computer blade from previous archives, the restore process may overwrite files X and Y with archived versions of X and Y, may create a new file Z, and may not alter file W.

In one embodiment, when the "Recover Sequentially to this archive" button 1317, 1319, and 1321 is clicked for a particular archive in a backup, the button may cause a restoration of each archive up to and including the selected archive. For example, if archives A, B, C, D, E, and F, are displayed (not shown), clicking on archive D may result in A, B, C and D being restored to a replacement computer blade. However, if there are additional archives, E and F, they will not be restored. The administrator may return to this view and choose further restoration for E, or both E and F. In addition, in one embodiment, the restoration to a replacement computer blade may be non-destructive. In other words, though the restoration may overwrite existing files when their names clash with files present in a restored archive, the restoration may not delete files that do not exist at all in the restored archives. For example, if files X, Y and Z are present in a next archive to restore to a replacement computer blade in a sequential restoration, and prior to restoring the next archive, older versions of X and Y, and a completely different file, W, have already been copied over to the replacement computer blade from previous archives, the restore process may overwrite files X and Y with archived versions of X and Y, may create a new file Z, and may not alter file W.

In one embodiment using VNAS, files may be replicated throughout the network at various storage devices that participate in the VNAS cluster. If one of the underlying VNAS storage devices fails, any requests for data on the failed device may be redirected to a functioning machine having a copy of the requested data. This redirection may be handled in a way that is transparent to the user. Thus, the information recovery view 1301 may be little-used in many circumstances where VNAS is utilized and the replication factor is sufficient to provide adequate copies of data.

Figure 14:
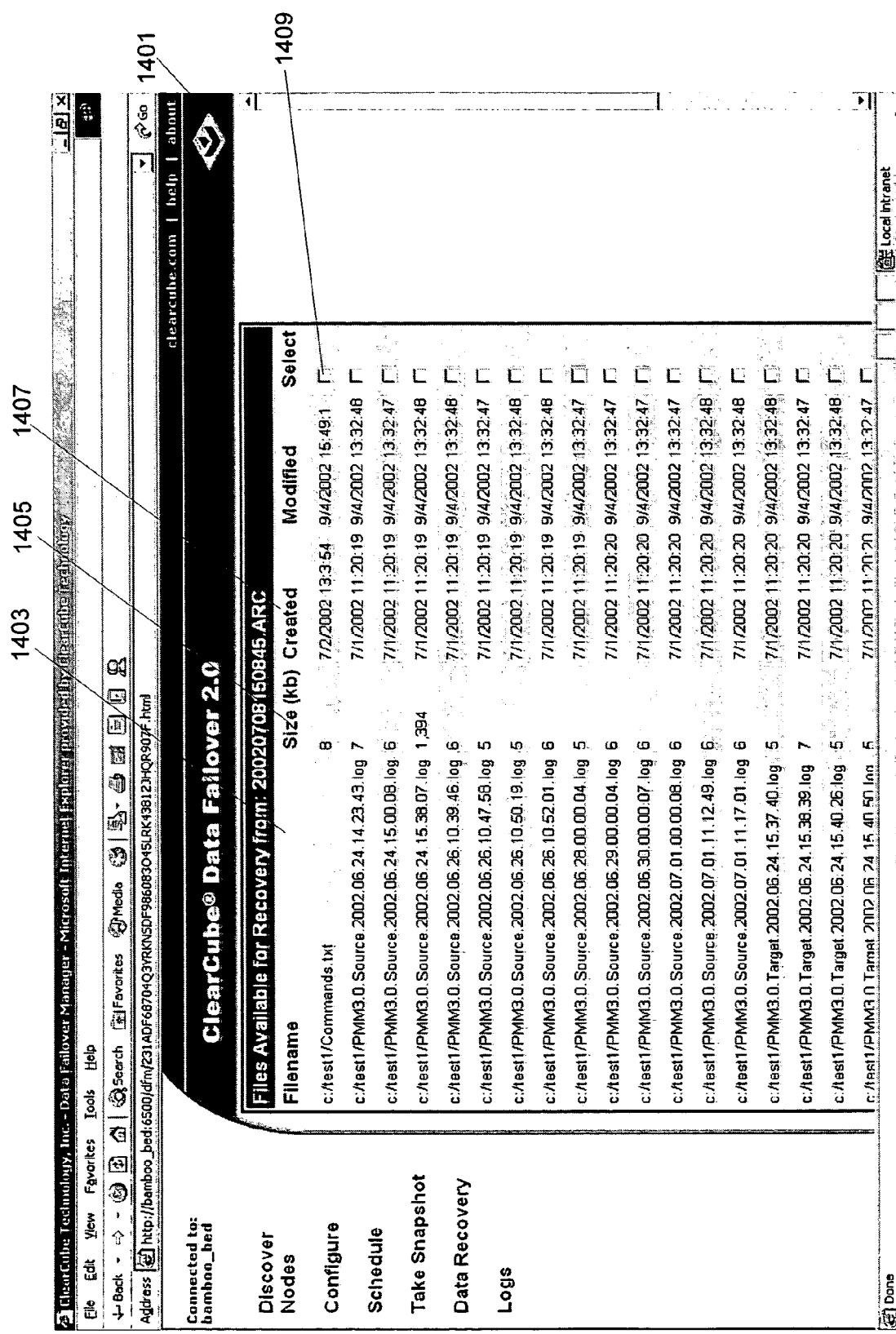
FIG. 14 illustrates an archive view screen, according to an embodiment.

FIG. 14—Screen Shot of an Archive View Screen

FIG. 14 illustrates an embodiment of an archive view screen 1401. In one embodiment, each file 1403, each file size 1405, and each file's date of creation 1407 may be listed. Checkboxes, such as checkbox 1409, may be selected for partial restoration of an archive. Corrupted or accidentally deleted information from backups may be selected and restored.

Figure 15:
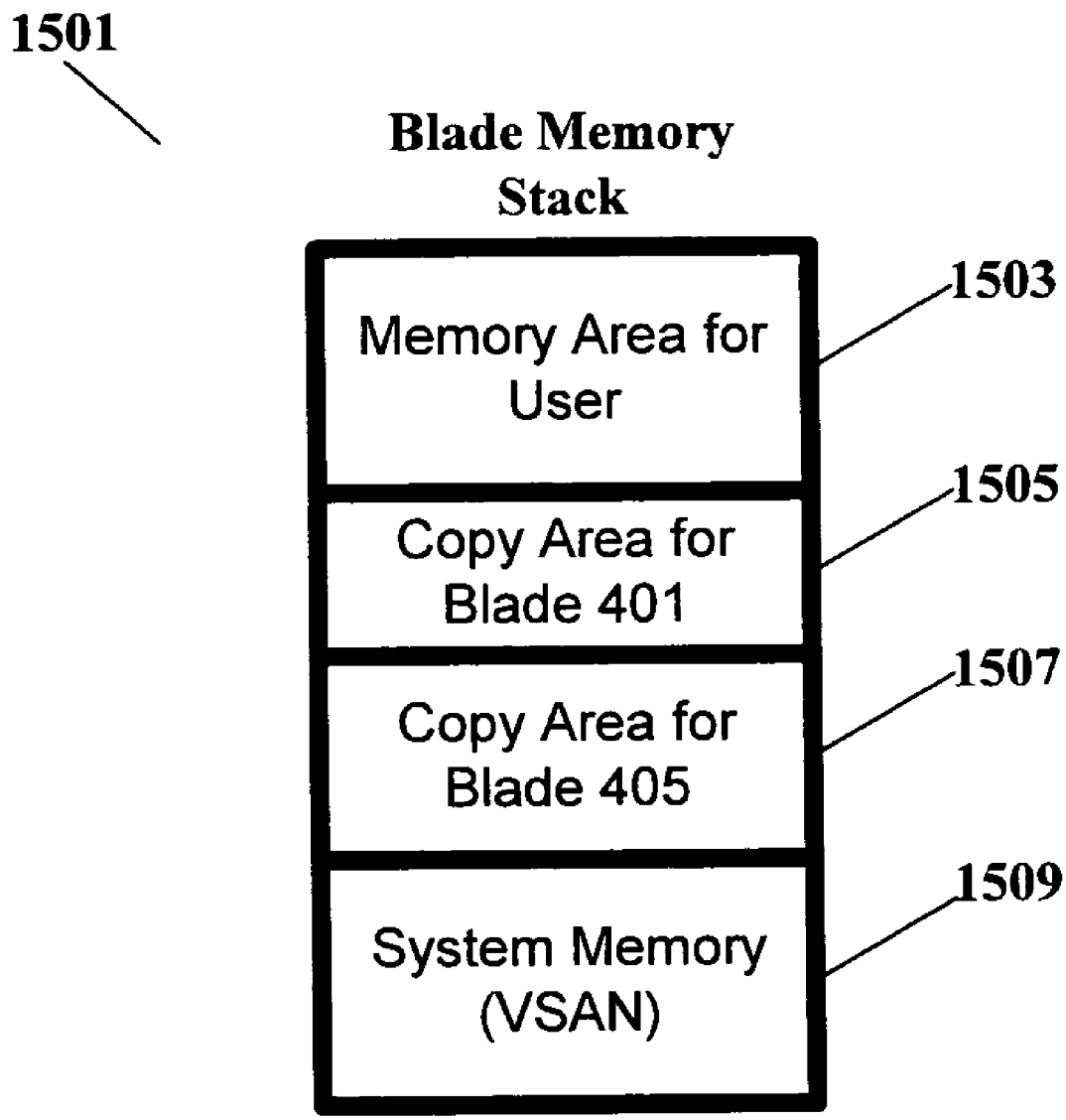
FIG. 15 illustrates a memory stack on a computer blade storing information from other computer blades, according to one embodiment.

FIG. 15—Memory Stack For a Computer Blade

Referring to FIG. 15, an embodiment of a memory stack for a computer blade storing information from other computer blades is shown. In one embodiment, the user's computer blade, e.g., computer blade 403, and two additional computer blades, e.g., computer blades 401 and 405, may each use memory space on the hard drive 208 in the user's computer blade 403. In the embodiment shown, the memory spaces used by the blades include memory spaces 1503, 1505, and 1507, although in other embodiments, other memory spaces may be defined and used. In addition, as FIG. 15 indicates, there may be additional memory space 1509 available for use by a virtual network attached storage (VNAS) system 1509. In one embodiment, a storage network with a storage area network server may be coupled to the computer blade 401 and 405. The storage network server may make the storage medium of computer blade 401 accessible by the processor of the computer blade 405, and to make the storage medium of the computer blade 405 accessible by the processor of the computer blade 401. In one embodiment, the organization and manipulation of the user's computer blade memory space may be such that the blade memory space does not have a single point of failure, as described below in detail. By eliminating single points of failure, the computer blades 401, 403, and 405 together may be more reliable for use in such applications as e-commerce, trading floors, and repair call centers, among others.

In one embodiment, each computer blade 401, 403, and 405 may have some file server functionality. The file server functionality may include some I/O capabilities, and may also include functionality for negotiating file write and read protocols. Communicating with the computer memory on the computer blades 401, 403, and 405 may be analogous to communicating with a standard file server attached memory. The computer blades 401, 403, and 405 may negotiate information writes similar to a file server, and order and prioritize transactions. In one embodiment, the computer blades 401, 403, and 405 may also implement striping analogous to one used by RAID (Redundant Array of Inexpensive Disks).

A fail-forward hard drive may also utilize NAS/SAN techniques. In one embodiment, the computer blades 401, 403, and 405 may operate as a distributed NAS server. For example, in one embodiment, the computer blades 401, 403, and 405 may utilize unused memory space in a manner analogous to that used by NAS and SAN, and may also track the location of hardware and information in the system. In one embodiment, a virtual NAS (VNAS) system may be implemented where the NAS server software is distributed across the peer computer blades 401, 403, and 405 (and/or other computer blades) in the network, thereby eliminating the NAS server as a point of failure. In one embodiment, each of the computer blades 401, 403, and 405 may maintain a copy of the NAS server software. In one embodiment, the computer blades 401, 403, and 405 may store the NAS server software and may be able to transfer a copy of the software to one of the remainder of the computer blades 401, 403, and 405 in the event of a failure of a computer blade 401, 403, or 405. As mentioned above, the computer blades 401, 403, and 405 may also use computer blades 401, 403, and 405 (i.e., each other) for other software storage, as desired. The VNAS system is described further with respect to FIGS. 24 and 25.

As described in detail above, when a hard drive or computer blade fail-over condition occurs, failure management software may execute to rebuild the hard drive contents on a replacement hard drive, and replace the failed computer blade in the network with a replacement computer blade. In one embodiment, the failure management software may route information reads and information writes from and to the failed hard drive to the replacement computer blade such that the user may not be aware of a failure. In one embodiment, the failure management software may execute on a central management server, optionally with a backup server in case of failure, although this approach may still present critical points of failure. In one embodiment, the failure management software may be distributed over the computer blades 401, 403, and 405, such that the entire storage management system is distributed, i.e., decentralized to eliminate single points of failure. Thus, in this embodiment, the computer blades 401, 403, and 405 may not need a central server. In one embodiment, the systems and methods described herein may be used to augment an existing NAS and SAN distributed hard drive system.

In one embodiment, the VNAS system may implement an algorithm for a data fail-over system. The VNAS system may be operable to couple computer blades 401, 403, and 405 to the VNAS system, and to configure a resource manager. The computer blades 401, 403, and 405 may also be coupled to an enterprise network. The resource manager may be operable to manage the VNAS system, including information writing and striping protocols. In one embodiment, the resource manager may be located on one of the computer blades 401, 403, and 405 coupled to the VNAS system. In another embodiment, a copy of the resource manager may operate on each of the computer blades. In yet another embodiment, the resource manager may be distributed across the plurality of the computer blades, e.g., computer blades 401, 403, and 405. The information and other configuration information may be saved across computer blades 401, 403, and 405 in the VNAS system by the resource manager. Each computer blade 401, 403, and 405 coupled to the VNAS system may be involved in storing the information for the other computer blades 401, 403, and 405. The VNAS system may check if the computer blades 401, 403, and 405 in the VNAS system are functioning properly, and if the VNAS system determines that one of the computer blades 401, 403, or 405 has failed, may provide a replacement computer blade 501, as described above. The vital information on the failed computer blade 401, 403, and 405 may have been distributed across the computer blades 401, 403, and 405 in the VNAS system prior to the fail-over condition. The VNAS system may thus access the computer blades 401, 403, and 405 in the VNAS system to retrieve the vital information for the replacement computer blade 501. In one embodiment, by the use of resource managers, the computer blades 401, 403, and 405 may schedule efficient information storage among themselves, e.g., over respective others of the computer blades 401, 403, and 405.

Figure 16:
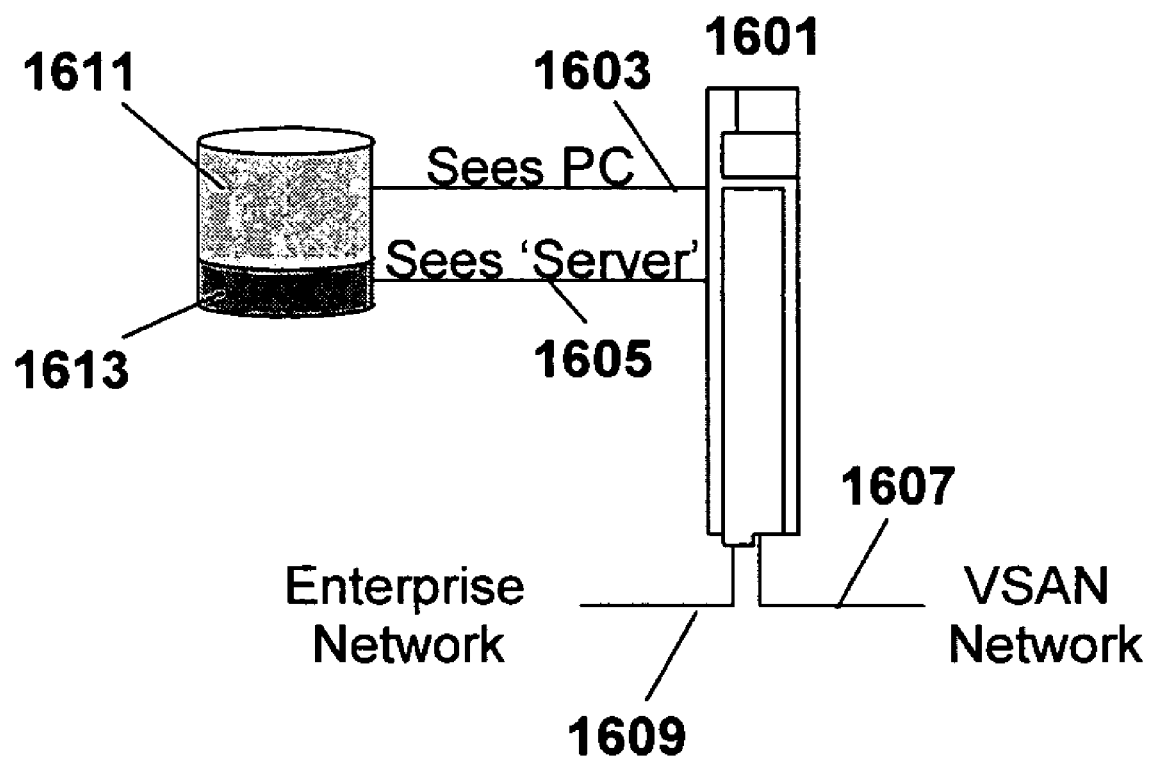
FIG. 16 illustrates a memory stack for a computer blade separated by a PC region and a Server region, according to one embodiment.

FIG. 16—Memory Stack with a PC Region and a Server Region

Referring to FIG. 16, an embodiment of a memory stack for a computer blade partitioned into a PC region 1611 and a Server region 1613 is shown. As mentioned above, in one embodiment, each computer blade 1601 may have some server functionality. The server functionality may include some I/O functionality and the ability to negotiate file write and read rules, as mentioned above. The computer blade 1601 may negotiate writes similar to a file server, and order and prioritize transactions. The computer blade 1601 may also be coupled to an enterprise network 1609 and a VSAN network 1607. Thus, in one embodiment, server functionality for the system may effectively be distributed over the plurality of computer blades, thereby removing any single points of failure associated with the user of a central server.

Figure 17:
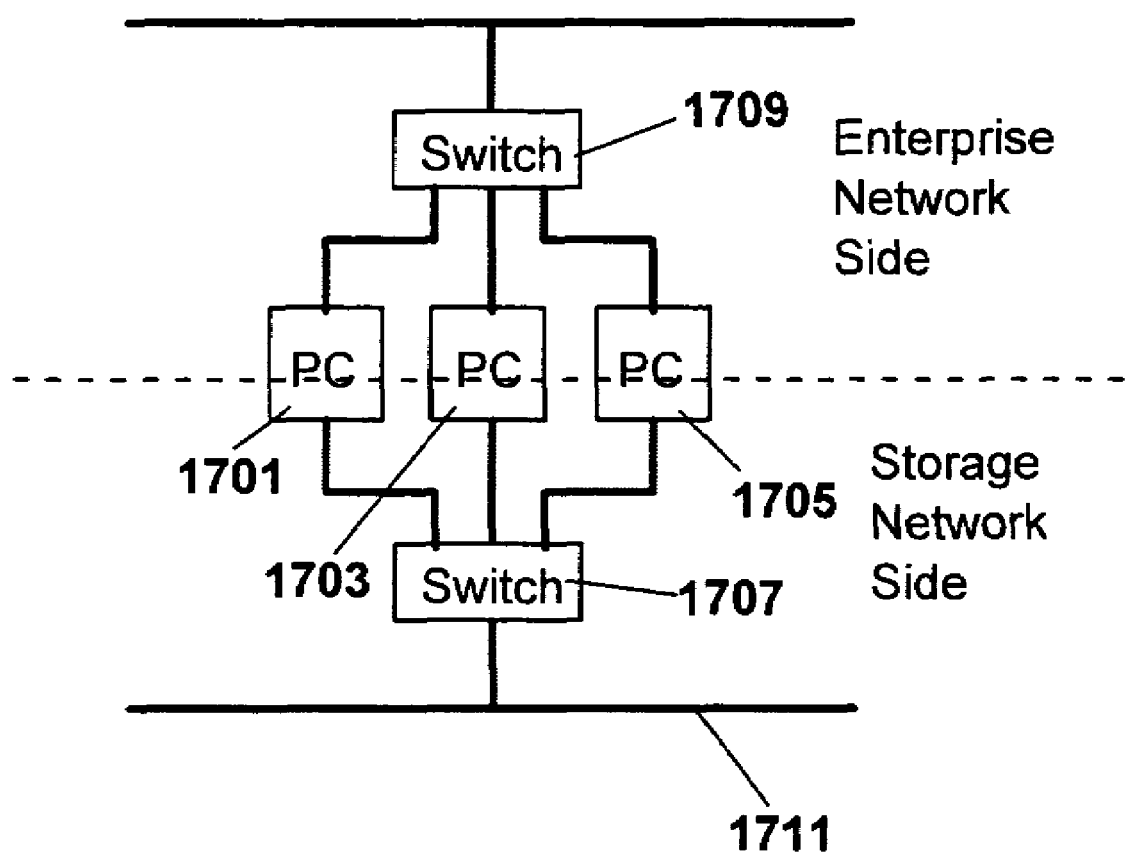
FIG. 17 illustrates an enterprise switch and a storage network switch controlling attached PCs, according to one embodiment.

FIG. 17—Enterprise Switch and Storage Network Switch

Referring to FIG. 17, an embodiment of an enterprise network switch 1709 and a storage network switch 1707 controlling attached PCs 1701, 1703, and 1705, which in one embodiment, may be computer blades. As is well known in the art, a Network Attached Storage (NAS) device may be a group of hard disk drives that connect to a network, such as but not limited to an Ethernet. The NAS device may function like a server to implement file sharing. The NAS may allow more hard disk storage space to be added to the network without shutting down attached servers for maintenance and upgrades. As is also well known, a Storage Area Network (SAN) may be a network of shared storage devices. The SAN may make the storage devices coupled to the SAN available to servers coupled to the SAN. As more storage devices are added to the SAN, the additional storage devices may be accessible from any server in the SAN.

The NAS or the SAN may consist of multiple hard disks in a box with a system to serve the information out onto the network. The NAS or the SAN may use a central or limited distribution control and management node, e.g., a server, to keep track of file locations and to distribute files for storage.

In one embodiment of the invention, the computer blades 1701, 1703, 1705 may function as the server to form a VNAS environment 1711. The computer blades 1701, 1703, and 1705 may negotiate file write rules, file reads, and order and prioritize transactions. Storage mediums on the computer blades 1701, 1703, and 1705 may function as a standard server attached memory.

In one embodiment, the computer blades 1701, 1703, and 1705 may have an internal index of files in the form of a location file stored on other computer blades 1701, 1703, and 1705. The location file may indicate where information from various computer blades have been stored on other computer blades. The computer blades 1701, 1703, and 1705 may also store striping and write rules. Each file stored in the VNAS 1711 may have different striping rules that may be determined by the nature of the file and the expectations of a system administrator. The VNAS 1711 may use a transponder Routing Information Protocol (RIP) to disseminate files on the computer blades 1701, 1703, and 1705. The RIP may be a protocol defined by RFC 4038 that specifies how routers exchange routing table information, although other protocols may also be within the scope of the invention. Using the RIP, computer blades 1701, 1703, and 1705 may periodically exchange entire routing tables. The RIP may broadcast the name, index, and rules for a memory domain of the computer blades 1701, 1703, and 1705, where, for example, the broadcasts may occur in response to a change in the index, or to a lapse of a specified time period. To improve network performance, the files may be moved to reorganize the storage space or moved based on the frequency of use. For example, if the file is heavily used it may be moved to a "closer" computer blade in which there are fewer intervening switches, e.g., Ethernet links, between the file and a user of the file. Finally, the computer blades 1701, 1703, and 1705 may be operable to query an index for a specific (instant) update.

In one embodiment, if a computer blade, e.g., computer blade 1701, is seeking a file, the computer blade 1701 may search the computer blade's internal index. The computer blade 1701 may also send a query to another computer blade, e.g., computer blade 1703, that may be listed as a primary source of the file in the internal index. The computer blade 1701 may then access the file. If multiple computer blades attempt to access the file at the same time, the computer blade with the file may negotiate a multiple transaction session. After the computer blade 1701 accesses the file, the computer blade 1703 with the file may perform a backup according to read/write rules stored on the VNAS.

In one embodiment, the resource manager may function both as an analyzer and a controller when accessing the entire VNAS system 1711. As an analyzer, the resource manager may utilize information about the performance and use patterns of the entire VNAS system 1711. Based on the performance and use patterns, the resource manager may compute demand and usage metrics or issues (e.g., processor time, memory usage and demand, hard drive memory, and network information) as well as generate reports on the applications and links used. These patterns may be used to generate a map of the demands on the system's collective resources over time. The continually updated map may be used by the system administrator and/or the resource manager in order to perform predictive and proactive scheduling of resources to users. Other uses of the map may also be within the scope of the invention.

In one embodiment, in case of a first computer hard drive failure, the user of the first computer may not notice any downtime. In other words, as noted above, the fail-over process may be transparent to the user. The hard drives on the second and third computers may be the storage medium for the user through the VNAS so that a replacement processor only has to access the already copied information from the user's computer. In addition, the failed hard drive on the user's computer may be replaced with a new hard drive. In one embodiment, the new hard drive may be brought into the computer system, i.e., the user's computer, independently and without intervention of the user.

In one embodiment, when the participating computers in a VNAS cluster are NAS servers, VNAS allows new storage capacity, in the form of a new NAS server to be added, or existing capacity to be removed, without affecting the uptime of the VNAS volume. In this, VNAS running on NAS servers provides SAN level capabilities in the area of zero downtime while adding or removing storage, without any hardware modifications to existing NAS products.

In one embodiment, the computer blades may be additionally coupled to an external RAID system. The coupling to an external RAID system may give the computer blades more redundancy and reliability. In addition, the computer blades may also be coupled to separate NAS and SAN storage networks. A distributed VNAS storage management system may minimize or eliminate points of failure in the networked distributed computer system. At least a portion of the VNAS server software and the failure management software may be distributed over the computers in the network, reducing or removing central servers as a point of failure. In one embodiment, the distributed computer system may include a plurality of centrally located computers with respective human interfaces located remotely from the computers.

FIGS. 18-21—Move Manager Embodiments

In one embodiment, a move manager may provide the ability to undertake individual, workgroup, or department-level hardware moves. Move manager may be used when a fail-over condition is detected on a computer blade to restore the computer blade to a replacement computer blade. Move manager may also migrate an operating system, applications, and information from a user's old computer blade to a new computer blade without detecting a fail-over condition. In one embodiment, move manager may provide the ability to schedule moves to prevent network saturation during peak work hours. A scriptable interface may allow an administrator to control a move process and insert custom tasks or activities they would like to execute prior to initiating the move process, or upon the completion of a move. The move manager may also allow a system administrator to use a scriptable interface to add custom tasks to a move process. In various embodiments, the move process may include one or more of a one-to-one move, a cascading move, and a swap move, as discussed below.

Figure 18:
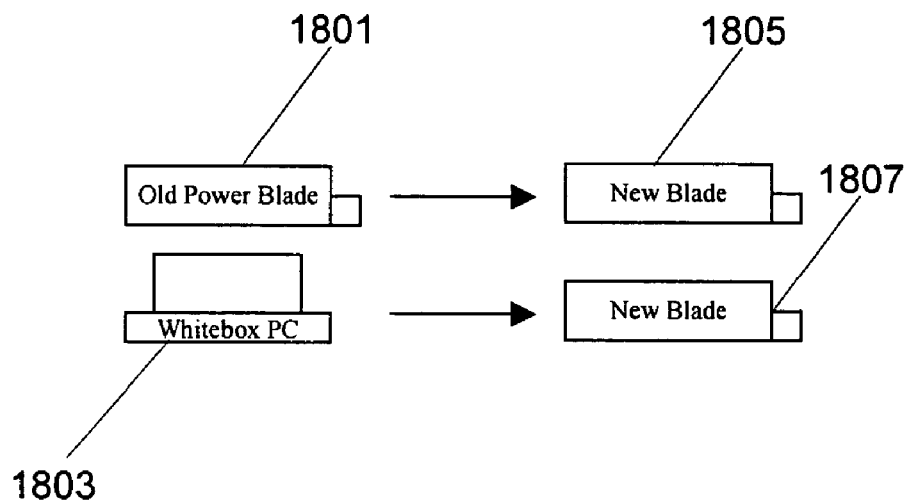
FIG. 18 illustrates a one-to-one move, according to two embodiments.

FIG. 18—A One-to-One Move

FIG. 18 illustrates a one-to-one move, according to two embodiments. In one embodiment, a single user of an existing computer, e.g., an old computer blade 1801, may be moved to new computer blade 1805. In another embodiment, a user of a legacy Whitebox PC 1803 may be moved or switched to new computer blade 1807. For example, the user may be moved for a hardware upgrade or unreliable performance of existing hardware. User preferences (such as desktop settings and icons) may be combined with other information and transferred over a network to the new computer blades 1805 and 1807 as a series of backup files (e.g., collected in archives or as "snapshots"). The backup files may be compressed packages for network transmission. In addition, a delta backup method, as discussed above, may be used.

Thus, in one embodiment, a first computer may be switched to the second computer in a one to one move by copying at least a portion of the information from the first computer to the second computer and switching the first peripheral device over to the second computer using the peripheral switch.

Figure 19:
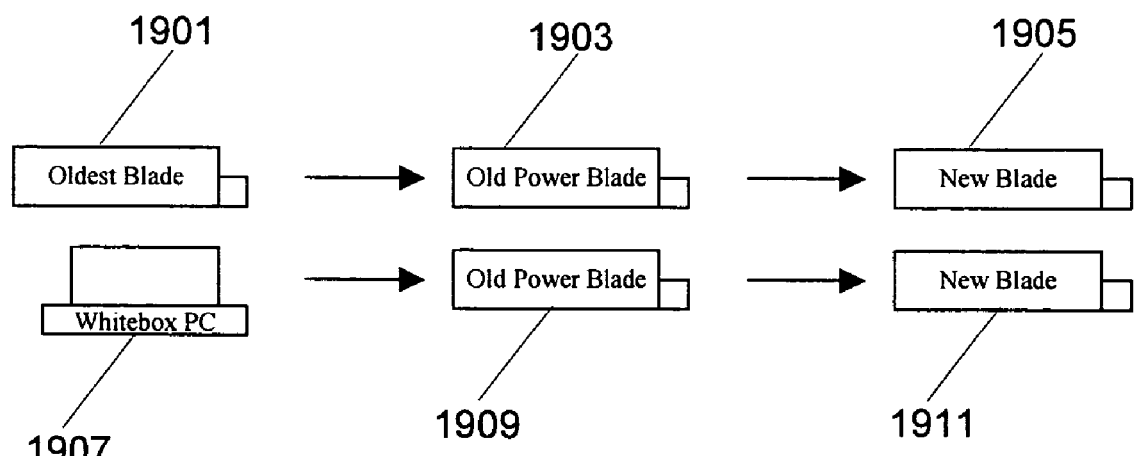
FIG. 19 illustrates a cascading move, according to one embodiment.

FIG. 19—Cascading Move

In one embodiment, a cascade move may be performed. For example, if a new powerful computer is added to the network, multiple users may be upgraded to computers more powerful than their currently assigned machines, e.g., based on computation needs, seniority, etc., where, for example, user A gets moved to the new computer, user B gets moved to user A's old computer, user C gets moved to user B's old computer, and so on. Thus, in this approach, the information from the first computer (user B's old computer) may be copied to the second computer (user A's old computer) while the information from the second computer (user A's old computer) is copied onto a third computer (the new computer). A peripheral switch may switch the first peripheral (i.e., user B's human interface) over to the second computer and may switch the second peripheral (i.e., user A's human interface) over to the third computer. Other switches may also be within the scope of the invention. For example, in one embodiment, a single peripheral switch may provide switching for all of the human interfaces. Alternatively, there may be a peripheral switch per computer or human interface. In yet another embodiment, the system may include a peripheral switch for each of a number of subsets of the computers/human interfaces.

FIG. 19 illustrates an embodiment of a cascading move where pairs of old computers are upgraded, possibly in parallel. In the embodiment shown, upon the arrival of a new set of computer blades 1905 and 1911, old computer blades 1903 and 1909, may be moved to new computer blades 1905 and 1911, respectively. Computers older than old computer blades 1903 and 1909, such as computer blade 1901 and legacy Whitebox PC 1907, may be moved onto the old computer blades 1903 and 1909, respectively. Other computers may also be within the scope of the invention.

Thus, for each upgrade path or series shown, a cascading move may be managed between a first computer, a second computer, and a third computer. In one embodiment, a copy of at least a portion of the information from the first computer may be copied onto the storage medium of the second computer. Information from the second computer may be copied onto a third computer. The peripheral switch may route signals from the first peripheral device to the second computer and from the second peripheral device to the third computer. Of course, in other embodiments, a cascading move may be performed for more than three computers.

FIG. 20—Swap Move

In one embodiment, a fail-over condition may include an indication of a need to swap the first computer with the second computer, e.g., to improve performance for a user, or to change environments (e.g., from Microsoft Windows to Apple MacOS). For example, if the second computer is a higher performing computer, and the user of the first computer needs more computational power than the user of the second computer, the computers assigned to each user may be swapped. In other words, the first computer (or another computer) may copy the information from the first computer over to the second computer, and the second computer (or another computer) may copy the information from the second computer onto the first computer. Similarly, a peripheral switch may swap the human interfaces for the respective computers, e.g., by routing signals from a first peripheral device (originally routed to the first computer) to the second computer, and from a second peripheral device (originally routed to the second computer) to the first computer.

Figure 20:
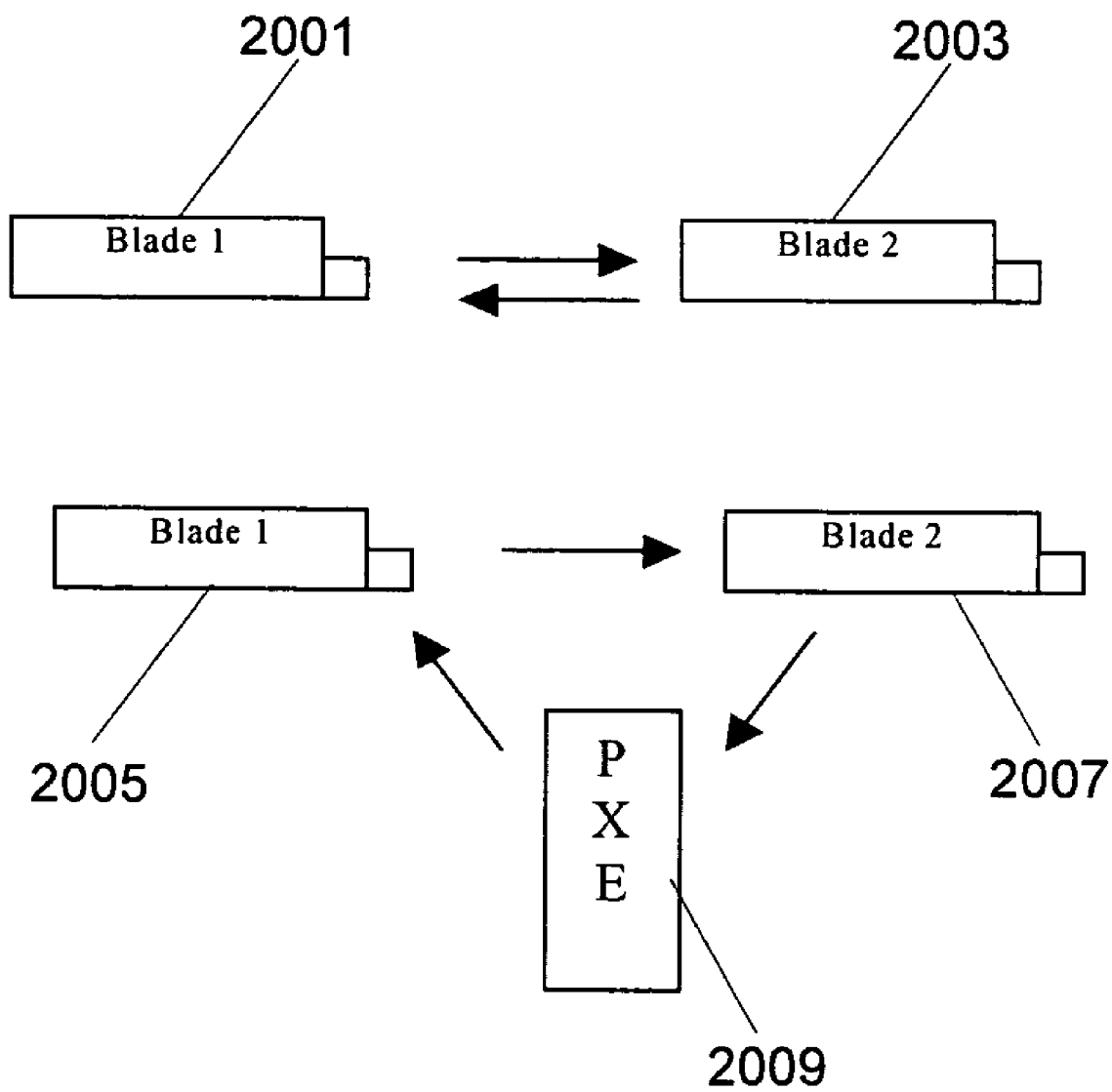
FIG. 20 illustrates a swap move, according to one embodiment.

FIG. 20 illustrates a swap move, according to one embodiment. As mentioned above, a swap move may be used to equalize or adjust the use of resources in a network (e.g., to put more demanding users with faster computer blades). The computer blades may be switched by two users, such as computer blades 2001 and 2003. Information, such as, but not limited to, applications and settings from one computer blade 2001, may be present on another computer blade 2003, post move, and vice-versa. In one embodiment, information from one of the computer blades 2005 and 2007 performing a switch, may be stored in a temporary third location to preserve the target computer blade 2007 while the switching computer blade 2005 overwrites the target computer blade's information. For example, an intermediate image server 2009 (based on PXE technology) may be used. Large-scale moves may also be within the scope of the invention. In moving multiple computer blades, moves may be scheduled for Operating System settings, profiles, applications, and user information from old computer blades to new computer blades.

In one embodiment of a swap move, at least a portion of the information from the storage medium of the first computer may be stored onto the storage medium of second computer, and at least a portion of the information from the storage medium of the second computer may be stored onto the storage medium of said first computer. The peripheral switch may switch the signal routing from the first peripheral device to the first computer to route to the second computer and the signal routing from the second peripheral device to the second computer to route to the first computer.

Figure 21:
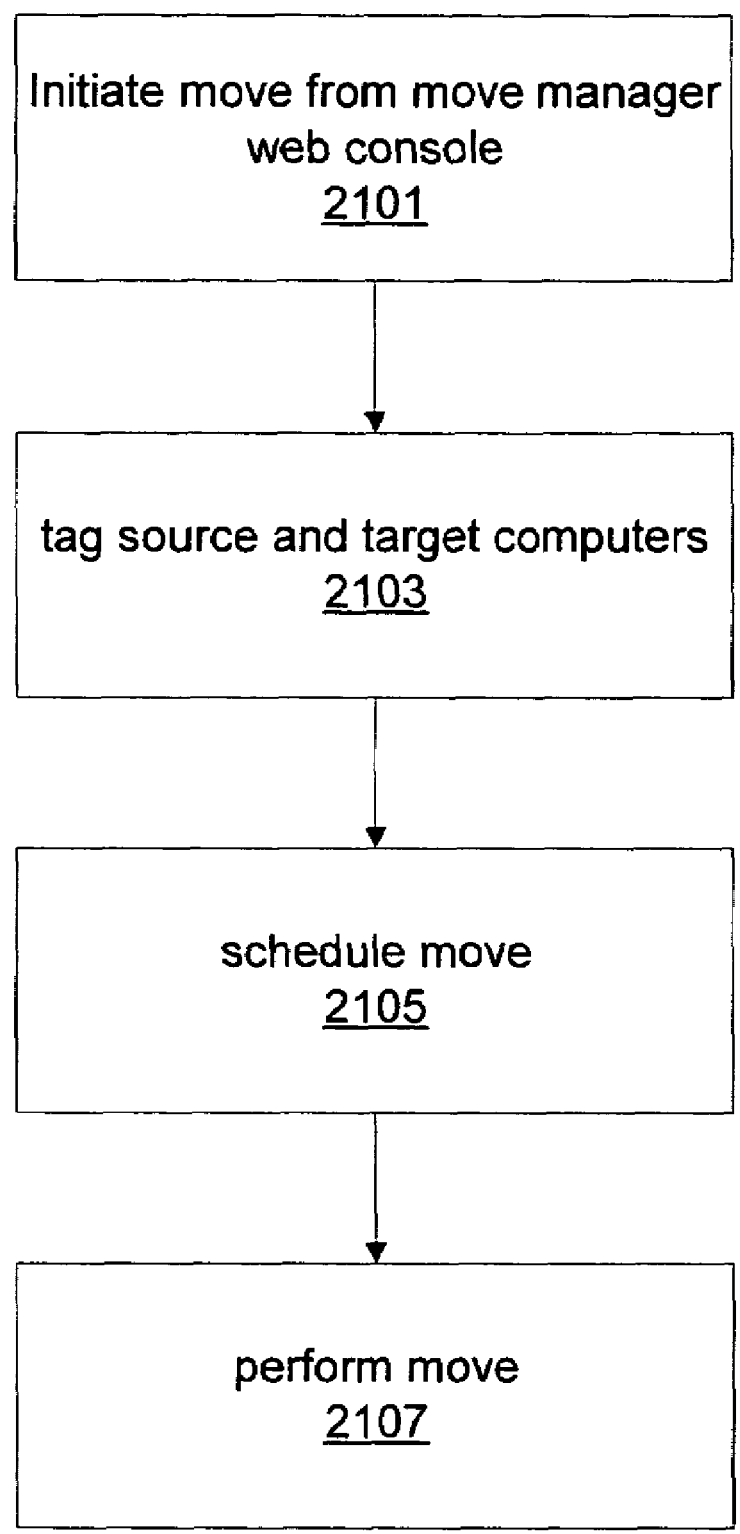
FIG. 21 flowcharts an initiation and process of a move, according to one embodiment.

FIG. 21—Flowchart of a Move Process

FIG. 21 flowcharts an initiation and process of a single computer move, according to one embodiment. It should be noted that in various embodiments of the method described below, one or more of the steps described may be performed concurrently, in a different order than shown, or may be omitted entirely. Other additional steps may also be performed as desired.

As FIG. 21 shows, in 2101, a move may be initiated, e.g., by a system administrator, or programmatically, i.e., automatically. For example, the move may be initiated as a result of one or more operation rules, or the system administrator may initiate the move from a move manager web console or other user interface.

In 2103, source and target computer blades may be tagged. In other words, one or more source/target pairs may be specified where information from each source computer is to be moved to the respective target computer, and/or one or more respective peripheral devices are to be switched from each source computer to the respective target computer.

In 2105, a move may be scheduled. Depending on the number of machines being moved, a schedule may be set to activate an image/backup process and move process at night to avoid any network saturation or other inconveniences during the work day.

Finally, in 2107, the scheduled move may be performed. In other words, at least a portion of the information from the source computer may be moved to the target computer, and any peripheral devices comprised in the human interface for the source computer may be switched to the target computer.

It is noted that any of the various moves described above (e.g., single computer switch, computer swap, and cascading move) may follow a similar process.

Figure 22:
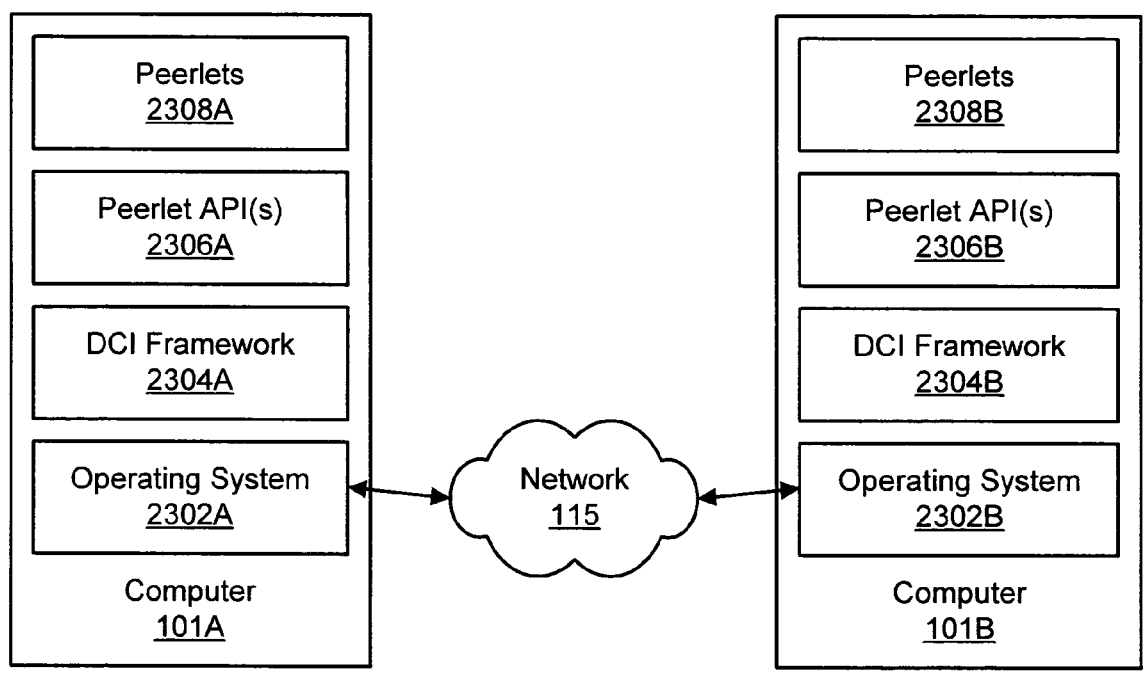
FIG. 22 is a block diagram illustrating a DCI architecture, according to one embodiment.
Figure 23:
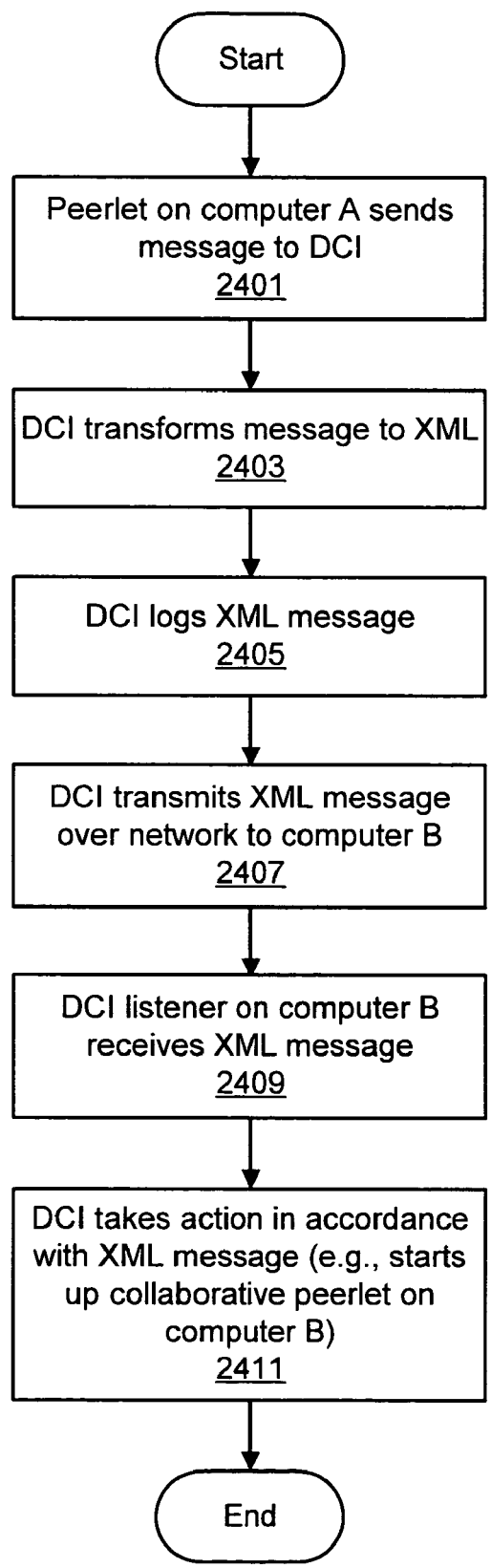
FIG. 23 is a flowchart illustrating a method for using DCI, according to one embodiment.

FIGS. 22 and 23—Distributed Computing Infrastructure

Drawing on the strengths of the blade-based hardware architecture shown in FIGS. 1 through 3, intelligent reconfiguration may be conducted for an enterprise-wide computing resources based on observed usage trends for individual computer blades. Often, in large companies, the latest and most powerful hardware is assigned to the newest employee simply as a function of the employee and the hardware arriving at roughly the same time. This may result in a disparate and inequitable assignment of resources across the enterprise. An engineer or developer with greater resource requirements could find himself equipped with an old machine, whereas a casual or non-power user could be using a more capable machine.

The hardware platform shown in FIGS. 1 through 3, due to its dense configuration and increased manageability, may provide a highly effective clustering solution. In one embodiment, a Distributed Computing Infrastructure (DCI) adds to these underlying capabilities by providing a software platform for creating, running, and managing distributed applications.

In one embodiment, the DCI software solution includes a framework that provides a variety of management and deployment functions for creating and running large-scale distributed applications. In one embodiment, DCI may be implemented using a Java-based framework. The infrastructure is not dependent on the presence of a server and therefore eliminates a single-point bottleneck that often slows performance of distributed applications. The DCI solution is primarily designed to make it easy for domain specialists (biologists, mathematicians, etc.) to re-leverage existing code modules, scripts, and applications and adapt them to make use of the immense power of cluster solutions.

In one embodiment, DCI may include socket-level communications services provided through a multi-threaded server. In one embodiment, DCI may include embedded support for HTTP communications provided through a multi-threaded server. In one embodiment, DCI may include embedded support for free-form XML communications provided through a multi-threaded server. In one embodiment, DCI may include SOAP protocol support.

In one embodiment, DCI may include meta-data (XML) routing of messages in peer-to-peer fashion, with time-to-live (TTL) based expiry. In one embodiment, DCI may include automated routing of incoming XML messages through to application tier with support for auto-invocation of recipient application based on message-type. In one embodiment, DCI may include directory functionality to allow applications to conveniently monitor online and connected peer nodes.

In one embodiment, DCI may include an ability to embed existing applications as Peer-to-Peer services without modifying them in source or binary form. In one embodiment, DCI may include use of XML to support cross-language bridging (language to language subroutine invocation) without modifying called pre-compiled application or scripts. In one embodiment, DCI may include a virtual file system to allow connected peers to share exposed files and folders under a navigable and structured file system. In one embodiment, DCI may include a distributed shell that exposes the underlying virtual file system in a command line environment, and also provides the ability to view, manage, and execute distributed applications.

In one embodiment, DCI may include application programming interface (API) support for unicast, multicast, and broadcast messaging. In one embodiment, DCI may include automated application update capability to obtain, install, or update new distributed applications using a network such as the Internet. In one embodiment, DCI may include graphical interface and desktop management functionality, to expose application interface in a consistent fashion to the end user. In one embodiment, DCI may include auto-discovery capability to rapidly search hundreds of entries in a network address space to locate machines (nodes) running DCI. In one embodiment, DCI may include cross-platform deployment capabilities including a Java-based infrastructure supported on a large number of platforms.

DCI may provide a windowed, graphical interface that can help visualize computational results or monitor progress of multiple jobs in a single environment. In one embodiment, applications may make use of the built in communications, directory, and XML routing capabilities of the underlying infrastructure. These applications would ordinarily be large and complex and would have to either utilize cryptic APIs such as MPI or contain implementations of sophisticated message passing and communications technology. In one embodiment, DCI eliminates most of this development and management overhead and provides a simple and consistent environment to develop, deploy, and manage distributed or cluster capable applications.

FIG. 22 is a block diagram illustrating a DCI architecture according to one embodiment. Each of two or more computer blades 101 (A and B, in this example) runs an operating system (OS) 2302. In one embodiment, the OS 2302 handles basic tasks like networking over TCP/IP. Each DCI-enabled computer system on the network 115 may include a DCI stack. The DCI stack may include the core DCI framework 2304, one or more peerlet APIs 2306, and one or more peerlets 2308.

Peerlets 2308 are applications that provide functions on DCI-enabled computers. For example, chat, whiteboard, and other collaborative applications may be implemented as peerlets that can take advantage of DCI. In some cases, peerlets can implement functionality themselves. Peerlets may also be "shells" that are used to invoke functionality provided by other pieces of software. Specific peerlet APIs (Application Programming Interfaces) 2306 provide an interface between the core DCI framework 2304 and specific peerlets. In one embodiment, peerlets are not network-aware but rather pass requests for network activity to the DCI framework 2304.

DCI may enable applications that were not originally designed for distributed computing to be executed in a distributed manner. For example, DCI may utilize an existing web browser without new integration code in the following manner. A user may request the retrieval of a web page from a remote web server (e.g., a news story from a news website), the combination of that web page with locally generated data (e.g., editorial comments from the user on the news story), and the storage of the combination on a database server. Using DCI, the user computer A may unicast a message to a web browser program on computer B to retrieve the web page. The output may be returned to computer A. Computer A may then combine the news story with the editorial comments in an XML message. This message may then be unicast to a command-line database program on computer C for storage in a database.

In one embodiment, DCI uses peer-to-peer message passing with no intermediary server. FIG. 23 is a flowchart illustrating a method for DCI message-passing according to one embodiment. In 2401, a peerlet on computer A generates a message to be sent to computer B. For example, a user may instruct a chat peerlet on computer A to request a chat session with a user on computer B or send a chat message in an ongoing, active chat session to a user on computer B. Generally, messages may include text and/or other data and metadata as well as requests to invoke the functionality of an application on another DCI-enabled computer.

In 2403, the DCI framework may transform the message to an XML (eXtensible Markup Language) format. The XML message may include the "payload" (i.e., the actual message to be delivered to the user on computer B) as well as a plurality of metadata elements. The metadata elements may include, for example, the type of application that send the message, the GUID (globally unique ID) of the instance of the application, and the sender.

In 2405, the DCI framework may log the XML message. In one embodiment, all tasks that have been reduced to XML messages may be logged to a message queue in archivable form. The XML messages in the queue may be sorted by application type, sender, receiver, etc. Activities may be replayed through the use of the logged XML messages.

In 2407, the XML message may be sent over the network from computer A to computer B. The XML metadata may include a TTL value indicating the total number of allowable "hops" before the message is considered undeliverable. This value is decremented with each network hop; when the value reaches zero, DCI may consider the message to be expired. To prevent denial-of-service attacks, a value in excess of a maximum value (e.g., 9) may be reset to that maximum value.

In 2409, a DCI "listener" in the core DCI framework on computer B may receive the XML message. In one embodiment, the DCI listener may utilize a UDP server to listen for incoming packets over an IP-based network connection. The use of UDP rather than TCP may allow for the rapid shipment of packets without the overhead of TCP. The UDP server may be multi-threaded for increased scalability and improved response time. In one embodiment, the actual communication between DCI-enabled computers may use a more reliable mechanism such as TCP.

In 2411, DCI may process the message, for example, to deliver its payload and/or invoke the requested functionality. In one embodiment, the DCI framework 2304B may determine the type of application that sent the incoming message using the XML metadata. If there is no application currently executing on computer B that can receive the message, the DCI framework 2304B may invoke an instance of the relevant application (e.g., a peerlet 2308B) on computer B. In one embodiment, DCI 2304B may queue the incoming message until the relevant application has started up. DCI 2304B may then transmit the queued message to the application.

Figure 24:
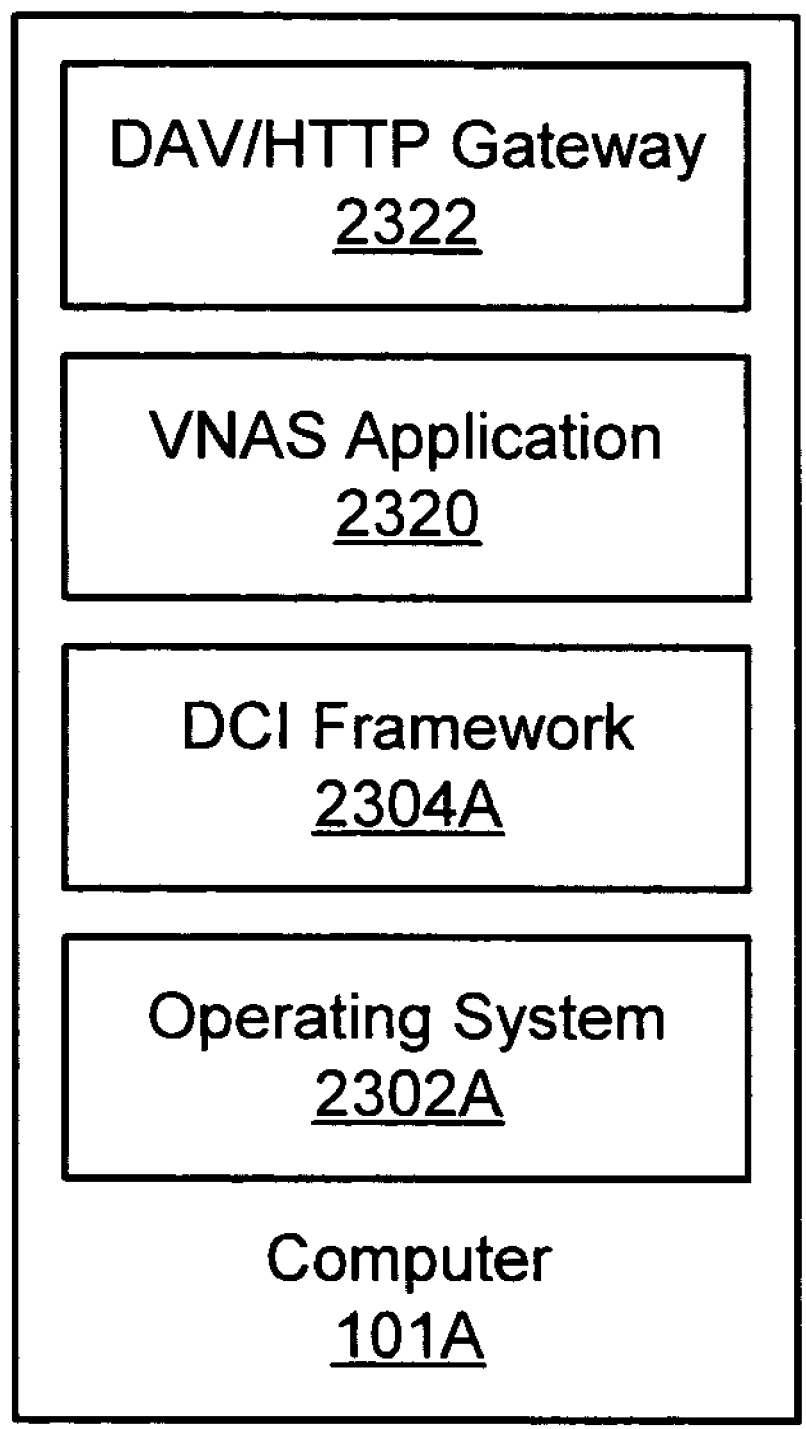
FIG. 24 illustrates a Virtual Network Attached Storage (VNAS) architecture, according to one embodiment.
Figure 25:
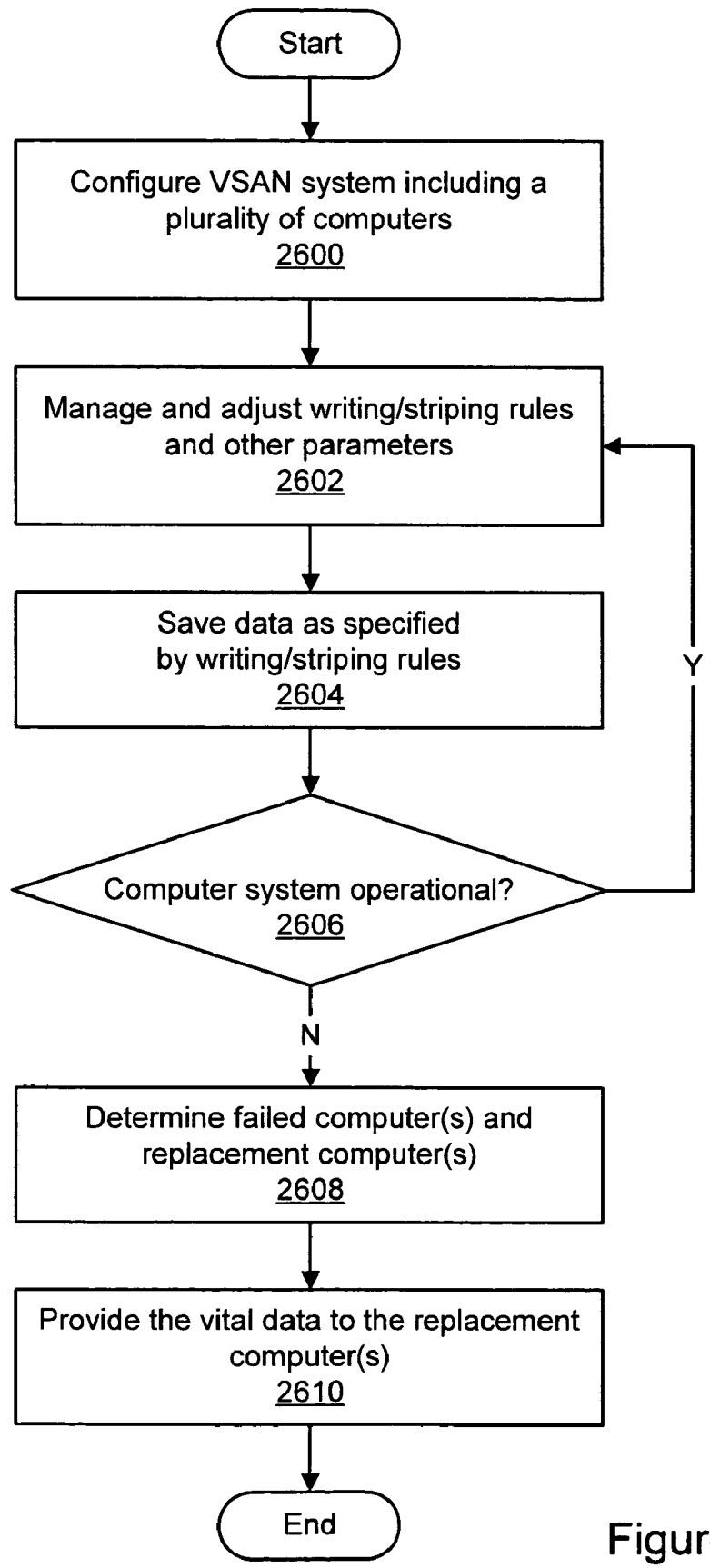
FIG. 25 is a flowchart illustrating a method for using a VNAS system, according to one embodiment.

FIGS. 24 and 25—Virtual Storage Using Excess Distributed Storage Capacity As discussed above, a Virtual Network Attached Storage (VNAS) system may be used to aggregate storage capacity from a number of blades and re-expose the aggregated storage to the network as one or more virtual volumes. VNAS may therefore allow the construction of secure and scalable storage solutions. Not only may the mean time between failures (MTBF) for the overall solution be extended as a result of replication, but the ability to stripe data across drives may also result in increased speed of access. With storage pooling under VNAS, unused network storage capacity may be salvaged, treated as a single volume, and provided to network-connected workstations. Instead of being bound by the relatively high access times of a single drive, the VNAS solution can stripe a single file across multiple physical drives residing in multiple blades, thus enabling parallel access for a single file-level object, and thus reducing overall access times.

In one embodiment, the VNAS architecture is based on a collection of "store nodes" which may include ordinary desktops or workstations. The store nodes contribute their excess disk capacity to the VNAS volume. Mount points, including computers such as desktop PCs, may allow a user to point to a single hostname (from a list of several) to "mount" and view the VNAS volume. In one embodiment, VNAS supports industry-standard protocols (e.g., DAV) which negate the need for any special software to be installed on a typical PC desktop in order for the user to browse the VNAS volume. There may be several mount points on a VNAS network, thereby eliminating a single point of failure.

In addition to their contribution to the reliability of VNAS, mount points may also act as local caches. For example, if a user in one department requests a document that is stored on store nodes physically located three switches away, that access may result in a copy of the document being cached on the closest mount point cache. This "auto-caching" capability may result in frequently accessed data being replicated at local points of presence, therefore minimizing the load on store nodes, minimizing network traffic, and reducing latencies of access resulting from multiple switch traversals.

In one embodiment, pooled storage under VNAS may be exposed to the end-user as a simple folder, directory, volume, or other unit of storage. Users may interact with the VNAS folder (e.g., to drag and drop files) just like they would interact with a regular folder In one embodiment, VNAS may be managed through a web-browser interface or other graphical user interface. Examples of browser-based interface screens are shown in FIGS. 9 through 14. Management of VNAS may include storage usage policies, file finding, node maintenance, node removal, and virtual volume maintenance.

FIG. 24 illustrates a VNAS architecture according to one embodiment. On a blade 101A, the DCI framework 2304A discussed with reference to FIGS. 23 and 24 may run on top of an operating system 2302A. VNAS 2320 may utilize the distributed computing infrastructure for communication with other blades. As a result of leveraging the DCI framework (including functions such as peer-to-peer message passing), custom VNAS software need not be present on clients in one embodiment, In one embodiment, VNAS uses industry-standard communications protocols 2322 such as DAV and HTTP to enable load balancing and scalability.

FIG. 25 is a flowchart illustrating a method for using VNAS to assist in data restoration, according to one embodiment. In 2600, the virtual network attached storage system may be configured for use. As discussed above, this configuration may include coupling the computers to the VNAS system and/or configuring a resource manager.

In 2602, the resource manager may manage the VNAS system, including write and striping rules. The resource manager may be located on one or more of the computers coupled to the VNAS system.

In 2604, the data and other configuration may be saved across one or more computers in the VNAS system according to the rules set up by the resource manager. Each one of the plurality of computers coupled to the VNAS system may be involved in storing the data for the other computers.

In 2606, the VNAS system may check if all of the computers comprised in the VNAS system are functioning properly.

In 2608, the VNAS system may determine one or more failed computers as well as one or more replacement computers. The vital data on the one or more failed computers is distributed across one or more computers comprised in the VNAS system.

In 2610, the VNAS system may access the one or more computers comprised in the VNAS system in order to retrieve the vital data for the one or more replacement computers.

Multiple Collaborative Sessions

With DCI in place, networked blades are capable of XML message exchange between distributed applications and application instances. This capability is leveraged by to provide one-to-one and one-to-many collaboration capabilities. In one embodiment, DCI enables multiple concurrent conversations for collaborative applications such as chat and whiteboard applications. Every time a new instance of an application starts up, DCI assigns that instance a GUID (globally unique ID).

For example, consider a chat session among users on computers A, B, and C. If user A starts up a new instance of a chat peerlet and sends a message intended for user B only, then DCI on computer B would start a new instance of the chat peerlet for receiving the message. The chat session among users A, B, and C would remain active but would be supplemented by another chat session between users A and B (using different instances of the chat peerlet). In this way, DCI can maintain security and other contextual boundaries between users on DCI-enabled computers.

Creating Complex Distributed Applications Using Existing Software

One of the areas in which DCI particularly assists users and domain experts that wish to develop and deploy computationally complex applications is application development through modular composition. This capability allows existing modules, command line programs, perl scripts, or other implementations to be seamlessly tied together, coupled with a graphical interface, and almost instantly transformed into a cluster capable application.

Figure 26:
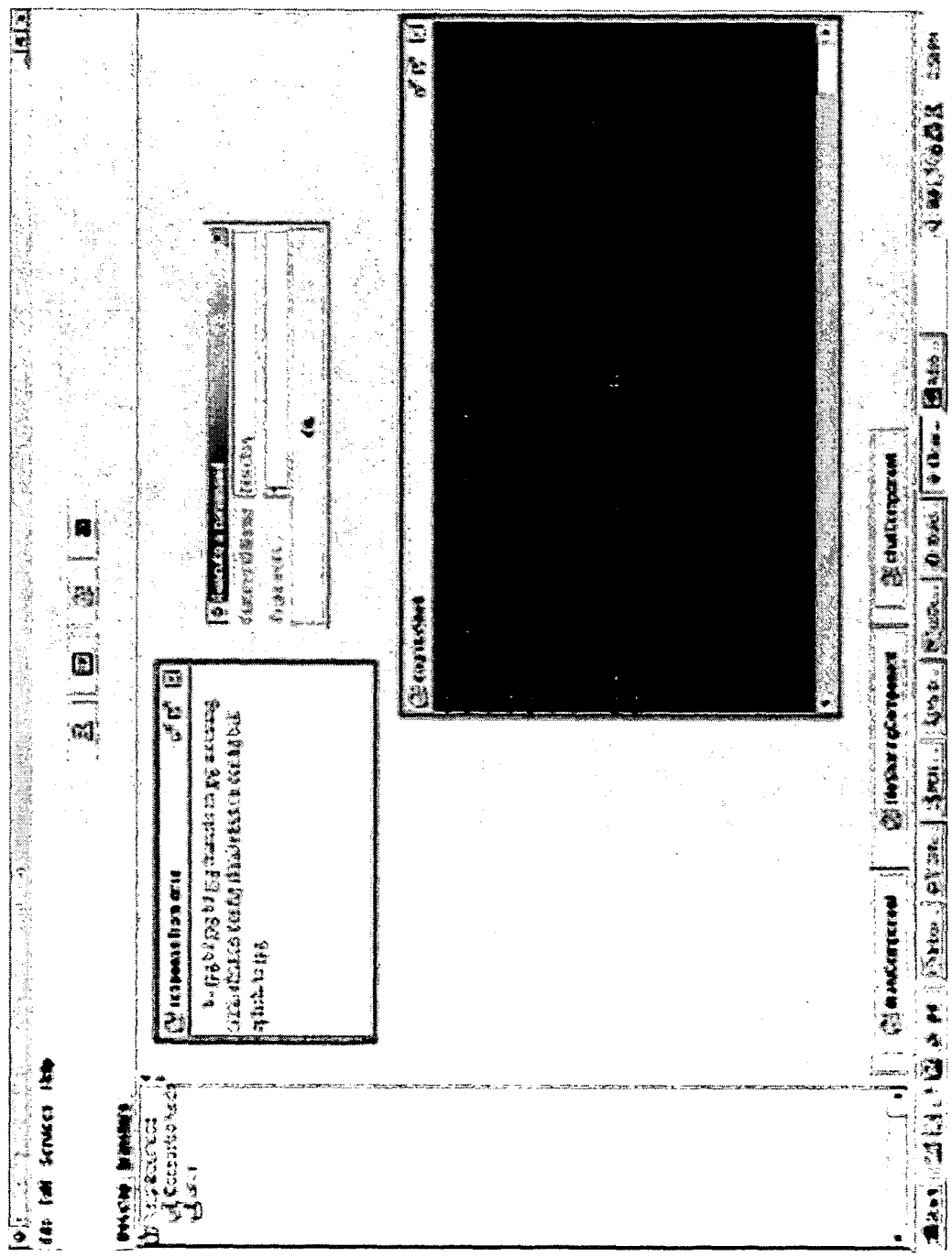
FIG. 26 is a screenshot that demonstrates a manner in which commands can be broadcasted to every node running the DCI platform, according to one embodiment.

FIG. 26 is a screenshot that demonstrates the simple manner in which commands can be broadcasted to every node (Blade or PC) running the DCI platform. The dialog box on the upper right hand side allows commands and arguments to be entered, while the simple results screen on the left shows the output of the command as received from a particular node. With functionality of this sort, management tasks such as distributed process listing across multiple operating systems, process deletion, or invocation, may be easy to implement and use.

Autonomous Intelligent Management System

In one embodiment, the Autonomous Intelligent Management System (AIMS) includes a collection of agents, applications, and tools built on top of the Distributed Computing Infrastructure. AIMS may augment the capabilities of human IT resources and enable IT managers to easily manage much larger numbers of systems than would otherwise be possible. AIMS may use existing (i.e., logged) XML messages to "play back" tasks on DCI-enabled computers. AIMS may also use new (i.e., synthetic) XML messages to invoke functionality on DCI-enabled computers.

Remote Management and Security Auditing may allow customers to sign up for remotely administered system configuration checks, security audits, license compliance, and similar administrative functions. The service may provide IT executives with reports of the exact status of each of their Blades, regardless of physical location. An enterprise-level report could include information on cluster of Blades in multiple geographical locations.

AIMS may also be used to enhance enterprise security. Ongoing monitoring for infection may include the ability to scan all files on disk, probe incoming emails and scan outgoing emails to ensure that Trojan horses or virus code is not being transported. Compliance with corporate security guidelines may allow system administrators to ensure that any one of thousands of enterprise desktops is compliant with security policies. When machines are newly delivered to employees, they are typically compliant to policies that may dictate installation of a certain version of a program because other versions may contain backdoors or exploitable loopholes. As the employee's usage of a PC progresses, new programs and files are routinely installed and de-installed. As a result, the workstations in a typical large enterprise do not comply with security guidelines within a matter of weeks after initial deployment. Because it is often difficult to manually visit each workstation and ensure compliance, AIMS may allow administrators to centrally monitor compliance and run security-oriented queries.

Patch deployment under AIMS may allow system administrators to remotely copy new patches and execute them remotely to modify existing programs that may have been outdated due to the discovery of security holes. Feature activation/deactivation under AIMS may allow fine-grained control over services such as web servers, database servers, or any other program that monitors incoming connections and thus may be prone to remote hacking. Service deactivation may allow system administrators to temporarily prevent remote entry while applying patches or taking other precautions.

Installation and package management may allow utilities and applications to be copied remotely, installed, and deployed on corporate workstations. This will negate the need for IT staff to physically visit desktops and install applications in that cumbersome manner.

Driver version management may allow administrators to query all systems for their installed drivers and driver versions. Mismatches, or version numbers not in compliance with manufacturer or enterprise guidelines will be tagged. Hardware or peripheral issues related to non-functioning drivers, or bad driver versions will be diagnosed and fixed remotely. This functionality will allow both individual machine level diagnostics and queries across the corporate network to ensure large-scale compliance with predefined guidelines.

Patch deployment may allow OS and Application-related patches and fixes to be copied and installed remotely. Disk De-fragmentation may allow administrators to remotely, at will, or according to a predefined schedule, conduct hard drive de-fragmentation operations. This will ensure that the performance of workstations does not degrade over time and that users of workstations do not have to worry about conducting such maintenance on their own, or suffer the decreased performance due to fragmented data.

Memory integrity tests may allow administrators to debug and fix memory related issues with workstations. Very often, unpredictable and random OS blue screening (i.e. crash) is caused by the presence of faulty or unreliable locations in memory. Writes or reads from these locations can result in the system crashing or suddenly rebooting. Memory integrity features will allow administrators to probe such issues remotely.

AIMS may also support performance and usage monitoring. Syslog Queries may enable the OS (e.g., Windows) system logs to be queried remotely. Currently, Windows 2 k does not provide capabilities where all logs of an entire network can be managed centrally, as each machine maintains its own logs. Syslog querying will allow queries to run on all machines on a network to monitor unique traffic, usage or performance related trends.

Threshold based pro-active reporting may allow administrators to specify thresholds with respect to key system variables and attributes. Rather than a human manually monitoring these variables, AIMS may maintain continuous background monitoring and will report threshold violations to an IT manager. This capability, when implemented on large networks, will provide a very significant advantage to IT staff in terms of timesavings and pro-active impending problem notifications.

Using emerging standards such as Voice XML, standard interactive interfaces may be constructed that can be uniformly interpreted and used by any Voice XML compliant application (including browsers). Combined with the local application integration capabilities of DCI, Voice XML and speech processing technology may allow applications to be controlled by repeating pre-recorded voice prompts.

Figure 27:
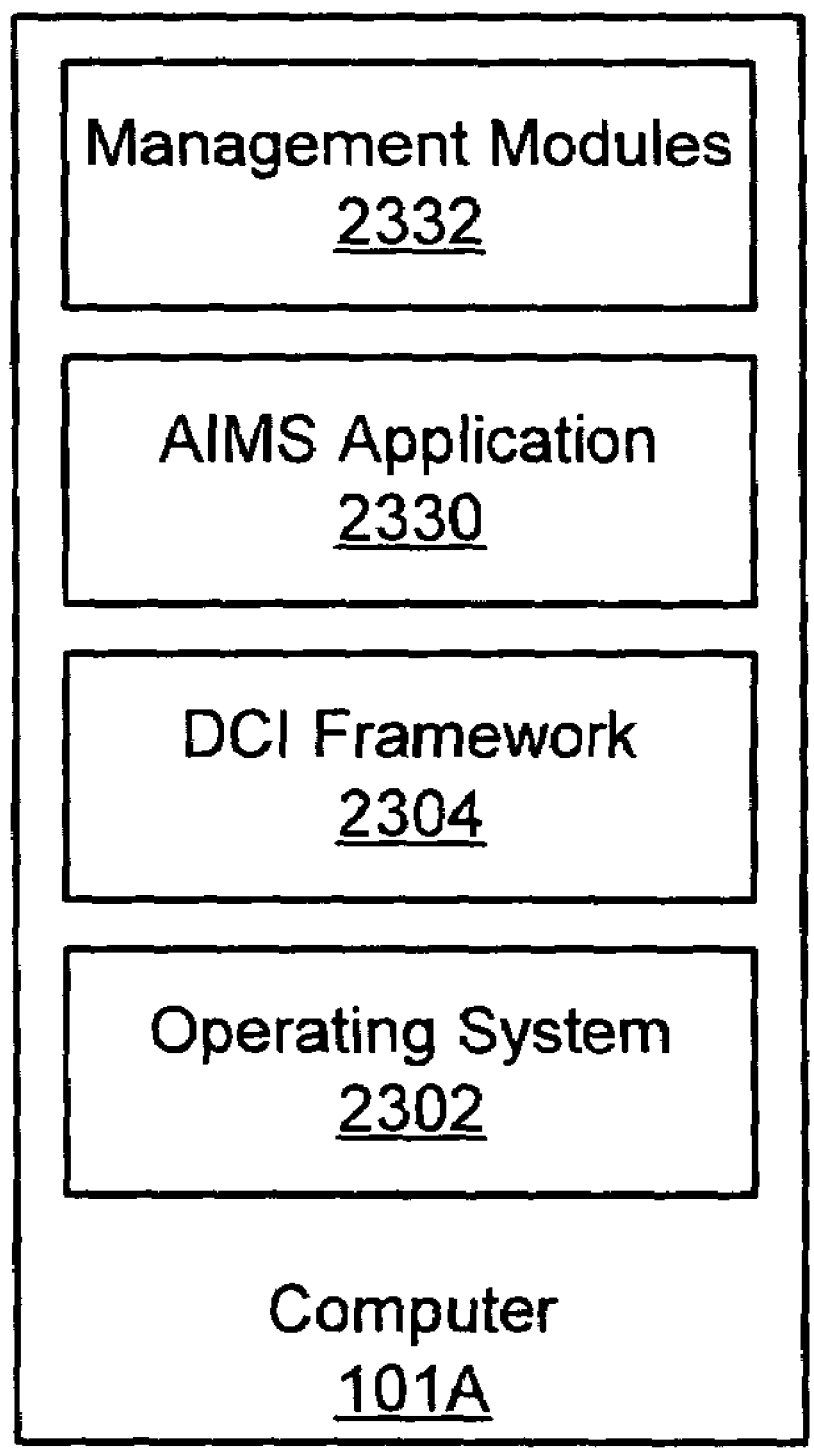
FIG. 27 is a block diagram illustrating an AIMS architecture, according to one embodiment.

FIG. 27 is a block diagram illustrating an AIMS architecture, according to one embodiment. Management modules 2332 may include security modules, application modules, etc. These modules may be added to the existing AIMS and DCI frameworks to suit the management needs of individual systems. The AIMS application 2330 and DCI framework 2304 may run on top of an operating system 2302 on all blades in the network.

Various embodiments may further include receiving or storing instructions and/or information implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as a network and/or a wireless link.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method comprising:
   generating a message from a source application on a first computer system, wherein the source application is configured to communicate using an application programming interface (API) to a distributed computing infrastructure, and wherein the source application is network-unaware;
   sending the message from the source application to the distributed computing infrastructure using the API;
   the distributed computing infrastructure translating the message from an original format to a portable format on the first computer system, thereby generating a portable message, wherein the portable message comprises metadata which comprise identifying characteristics of the source application; and
   sending the portable message from the first computer system to a second computer system using peer-to-peer message passing between the first computer system, the second computer system, and optionally one or more intermediary computer systems;
   receiving the portable message at the second computer system; and
   the distributed computing infrastructure routing the portable message to a target application on the second computer system based on the metadata, wherein the target application is configured to communicate using the API to the distributed computing determining an application type of the target application based on the metadata of the portable message;
   determining whether an existing instance of the application type of the target application is running on the second computer system;
   wherein the routing the portable message to the target application comprises routing the portable message to the existing instance if the existing instance of the application type of the target application is running on the second computer system; and
   wherein the routing the portable message to the target application comprises routing the portable message to a new instance of the target application if the existing instance of the application type of the target application is not running on the second computer system. infrastructure, and wherein the target application is network-unaware.

2. The method of claim 1,
   wherein the source application routes network activity through the API to the distributed computing infrastructure, and wherein the target application receives network activity through the API from the distributed computing infrastructure.

3. The method of claim 1,
   wherein the source application and the target application comprise chat applications enabling a user of the first computer system and a user of the second computer system to communicate using text;
   wherein the message from the source application comprises text to be displayed by the target application on the second computer system.

4. The method of claim 1,
   wherein the source application and the target application comprise shared whiteboard applications enabling a user of the first computer system and a user of the second computer system to communicate using graphical data on a virtual shared whiteboard;
   wherein the message from the source application comprises graphical data to be displayed by the target application on the second computer system.

5. The method of claim 1,
   wherein the source application and the target application comprise collaborative applications enabling a user of the first computer system and a user of the second computer system to communicate using collaborative data;
   wherein the message from the source application comprises collaborative data to be displayed by the target application on the second computer system.

6. The method of claim 1, further comprising:
   delivering a payload of the message to the target application.

7. The method of claim 1, further comprising:
   the distributed computing infrastructure translating the portable message from the portable format to the original format on the second computer system.

8. The method of claim 1, further comprising:
   invoking functionality of the second computer system in response to the message.

9. The method of claim 8,
   wherein the invoking functionality on the second computer system comprises instructing the target application to take one or more actions.

10. The method of claim 1,
    wherein the portable message is sent from the first computer system to the second computer system and one or more additional computer systems using multicast peer-to-peer messaging.

11. The method of claim 1,
    wherein the portable message is sent from the first computer system to the second computer system and one or more additional computer systems using broadcast peer-to-peer messaging.

12. The method of claim 1,
    wherein the portable format comprises XML, and wherein the portable messages comprise XML messages.

13. A computer-readable storage medium comprising program instructions, wherein the program instructions are computer-executable to implement:

generating a message from a source application on a first computer system, wherein the source application is configured to communicate using an application programming interface (API) to a distributed computing infrastructure, and wherein the source application is network-unaware;

sending the message from the source application to the distributed computing infrastructure using the API;

the distributed computing infrastructure translating the message from an original format to a portable format on the first computer system, thereby generating a portable message, wherein the portable message comprises metadata which comprise identifying characteristics of the source application; and sending the portable message from the first computer system to a second computer system using peer-to-peer message passing between the first computer system, the second computer system, and optionally one or more intermediary computer systems;

receiving the portable message at the second computer system; and the distributed computing infrastructure routing the portable message to a target application on the second computer system based on the metadata, wherein the target application is configured to communicate using the API to the distributed computing wherein the program instructions are further computer-executable to implement:

determining an application type of the target application based on the metadata of the portable message;

determining whether an existing instance of the application type of the target application is running on the second computer system;

wherein the routing the portable message to the target application comprises routing the portable message to the existing instance if the existing instance of the application type of the target application is running on the second computer system; and wherein the routing the portable message to the target application comprises routing the portable message to a new instance of the target application if the existing instance of the application type of the target application is not running on the second computer system. infrastructure, and wherein the target application is network-unaware.

14. The computer-readable storage medium of claim 13, wherein the source application routes network activity through the API to the distributed computing infrastructure, and wherein the target application receives network activity through the API from the distributed computing infrastructure.

15. The computer-readable storage medium of claim 13, wherein the source application and the target application comprise chat applications enabling a user of the first computer system and a user of the second computer system to communicate using text;

wherein the message from the source application comprises text to be displayed by the target application on the second computer system.

16. The computer-readable storage medium of claim 13, wherein the source application and the target application comprise shared whiteboard applications enabling a user of the first computer system and a user of the second computer system to communicate using graphical data on a virtual shared whiteboard;

wherein the message from the source application comprises graphical data to be displayed by the target application on the second computer system.

17. The computer-readable storage medium of claim 13, wherein the source application and the target application comprise collaborative applications enabling a user of the first computer system and a user of the second computer system to communicate using collaborative data;

wherein the message from the source application comprises collaborative data to be displayed by the target application on the second computer system.

18. The computer-readable storage medium of claim 13, wherein the program instructions are further computer-executable to implement:

delivering a payload of the message to the target application.

19. The computer-readable storage medium of claim 13, wherein the program instructions are further computer-executable to implement:

the distributed computing infrastructure translating the portable message from the portable format to the original format on the second computer system.

20. The computer-readable storage medium of claim 13, wherein the program instructions are further computer-executable to implement:

invoking functionality of the second computer system in response to the message.

21. The computer-readable storage medium of claim 20, wherein the invoking functionality on the second computer system comprises instructing the target application to take one or more actions.

22. The computer-readable storage medium of claim 13, wherein the portable message is sent from the first computer system to the second computer system and one or more additional computer systems using multicast peer-to-peer messaging.

23. The computer-readable storage medium of claim 13, wherein the portable message is sent from the first computer system to the second computer system and one or more additional computer systems using broadcast peer-to-peer messaging.

24. The computer-readable storage medium of claim 13, wherein the portable format comprises XML, and wherein the portable messages comprise XML messages.

25. A system comprising:

a first computer system comprising a first CPU and a first memory; and a second computer system comprising a second CPU and a second memory;

wherein the first computer system and the second computer system are communicatively coupled via a network;

wherein the first memory stores program instructions which are executable by the first CPU to:

generate a message from a source application on the first computer system, wherein the source application is configured to communicate using an application programming interface (API) to a distributed computing infrastructure, and wherein the source application is network-unaware;

send the message from the source application to the distributed computing infrastructure using the API;

using the distributed computing infrastructure, translate the message from an original format to a portable format on the first computer system, thereby generating a portable message, wherein the portable message comprises metadata which comprise identifying characteristics of the source application; and send the portable message from the first computer system to the second computer system using peer-to-peer message passing between the first computer system, the second computer system, and optionally one or more intermediary computer systems; and wherein the second memory stores program instructions which are executable by the second CPU to:

receive the portable message at the second computer system; and using the distributed computing infrastructure, route the portable message to a target application on the second computer system based on the metadata, wherein the target application is configured to communicate using the API to the distributed wherein the program instructions are executable by the second CPU to:

determining an application type of the target application based on the metadata of the portable message;

determining whether an existing instance of the application type of the target application is running on the second computer system;

wherein the routing the portable message to the target application comprises routing the portable message to the existing instance if the existing instance of the application type of the target application is running on the second computer system; and wherein the routing the portable message to the target application comprises routing the portable message to a new instance of the target application if the existing instance of the application type of the target application is not running on the second computer system. computing infrastructure, and wherein the target application is network-unaware.

26. The system of claim 25, wherein the source application routes network activity through the API to the distributed computing infrastructure, and wherein the target application receives network activity through the API from the distributed computing infrastructure.

27. The system of claim 25, wherein the source application and the target application comprise chat applications enabling a user of the first computer system and a user of the second computer system to communicate using text;

wherein the message from the source application comprises text to be displayed by the target application on the second computer system.

28. The system of claim 25, wherein the source application and the target application comprise shared whiteboard applications enabling a user of the first computer system and a user of the second computer system to communicate using graphical data on a virtual shared whiteboard;

wherein the message from the source application comprises graphical data to be displayed by the target application on the second computer system.

29. The system of claim 25, wherein the source application and the target application comprise collaborative applications enabling a user of the first computer system and a user of the second computer system to communicate using collaborative data;

wherein the message from the source application comprises collaborative data to be displayed by the target application on the second computer system.

30. The system of claim 25, wherein the program instructions are executable by the second CPU to:

deliver a payload of the message to the target application.

31. The system of claim 25, wherein the program instructions are executable by the second CPU to:

using the distributed computing infrastructure, translate the portable message from the portable format to the original format on the second computer system.

32. The system of claim 25, wherein the program instructions are executable by the second CPU to:

invoke functionality of the second computer system in response to the message.

33. The system of claim 32, wherein the invoking functionality on the second computer system comprises instructing the target application to take one or more actions.

34. The system of claim 25, wherein the portable message is sent from the first computer system to the second computer system and one or more additional computer systems using multicast peer-to-peer messaging.

35. The system of claim 25, wherein the portable message is sent from the first computer system to the second computer system and one or more additional computer systems using broadcast peer-to-peer messaging.

36. The system of claim 25, wherein the portable format comprises XML, and wherein the portable messages comprise XML messages.

* * * * *

UNITED STATES PATENT AND TRADEMARK OFFICE
CERTIFICATE OF CORRECTION

| | | |
|---|---|---|
| PATENT NO. | : 7,370,336 B2 | |
| APPLICATION NO. | : 10/662933 | |
| DATED | : May 6, 2008 | |
| INVENTOR(S) | : Husain et al. | |

It is certified that error appears in the above-identified patent and that said Letters Patent is hereby corrected as shown below:

In the Claims:

Column 37
Line 57, please delete "computing determining" and substitute -- computing infrastructure, and wherein the target application is network-unaware; determining --.

Column 38
Lines 5-7, please delete "is not running on the second computer system. infrastructure, and wherein the target application is network-unaware." and substitute -- is not running on the second computer system. --.

Column 39
Line 29, please delete "distributed computing" and substitute -- distributed computing infrastructure, and wherein the target application is network-unaware; wherein the program instructions --.

Column 39
Lines 46-48, please delete "running on the second computer system. infrastructure, and wherein the target application is network-unaware." and substitute -- running on the second computer system. --.

Column 41
Line 20, please delete "to the distributed" and substitute -- to the distributed computing infrastructure, and wherein the target application is network-unaware; --.

UNITED STATES PATENT AND TRADEMARK OFFICE
CERTIFICATE OF CORRECTION

PATENT NO. : 7,370,336 B2
APPLICATION NO. : 10/662933
DATED : May 6, 2008
INVENTOR(S) : Husain et al.

It is certified that error appears in the above-identified patent and that said Letters Patent is hereby corrected as shown below:

In the Claims:

Column 41
Lines 37-39, please delete "running on the second computer system. computing infrastructure, and wherein the target application is network-unaware." and substitute -- running on the second computer system. --.

Signed and Sealed this

Fifteenth Day of July, 2008

JON W. DUDAS
*Director of the United States Patent and Trademark Office*